US012017102B2

(12) United States Patent
Hansson et al.

(10) Patent No.: US 12,017,102 B2
(45) Date of Patent: Jun. 25, 2024

(54) DUAL PRESSURE FIREFIGHTING NOZZLE

(71) Applicant: Alden Research Laboratory, Inc., Holden, MA (US)

(72) Inventors: James B. Hansson, Holden, MA (US); Kimbal A. Hall, Princeton, MA (US); Daniel Bateman, Rutland, MA (US); David C. White, Providence, RI (US)

(73) Assignee: Alden Research Laboratory, Inc., Holden, MA (US)

( * ) Notice: Subject to any disclaimer, the term of this patent is extended or adjusted under 35 U.S.C. 154(b) by 333 days.

(21) Appl. No.: 17/080,220

(22) Filed: Oct. 26, 2020

(65) Prior Publication Data

US 2022/0126148 A1 Apr. 28, 2022

(51) Int. Cl.
*A62C 31/03* (2006.01)
*B05B 1/30* (2006.01)
*B05B 1/34* (2006.01)

(52) U.S. Cl.
CPC ................ *A62C 31/03* (2013.01); *B05B 1/30* (2013.01); *B05B 1/3033* (2013.01); *B05B 1/34* (2013.01)

(58) Field of Classification Search
CPC .................................. A62C 31/03; B05B 1/12
USPC .................................... 239/394, 438, 222.21
See application file for complete search history.

(56) References Cited

U.S. PATENT DOCUMENTS 2,552,445 A * 5/1951 Nielsen ..................... B05B 1/12 239/456
2005/0242206 A1* 11/2005 Saner ........................ B05B 3/04 239/296
2007/0007367 A1* 1/2007 Marino ..................... B05B 1/28 239/539
2009/0236446 A1* 9/2009 Trapp ..................... A62C 31/03 137/15.01
2015/0209605 A1* 7/2015 Keim ........................ B05B 1/12 239/524
2015/0306608 A1* 10/2015 Petter .................... B05B 1/3073 239/441

* cited by examiner

*Primary Examiner* — Jason J Boeckmann
(74) *Attorney, Agent, or Firm* — Whitmyer IP Group LLC

(57) ABSTRACT

A nozzle for dispensing a fluid having a barrel having a proximal end and a distal end, the barrel having a passage defined by a first internal surface extending between the distal end and the proximal end, and an orifice defined by a second internal surface at the distal end of the barrel, a stem located at least partially in the barrel, the barrel is movable in relation to the stem to switch between a low pressure mode and a high pressure mode, a shaper located around an outer surface of the distal end of the barrel, the shaper being movable in relation to the barrel to switch between a low pressure fog mode and a low pressure stream mode. The nozzle is configured to dispense the fluid in a straight stream or fog in both the low pressure mode and the ultra-high pressure mode. The orifice is also configured to provide flushing capability for the ultra-high pressure mode while operating in the low pressure mode.

19 Claims, 15 Drawing Sheets

DUAL PRESSURE FIREFIGHTING NOZZLE

GOVERNMENT ASSISTANCE

In accordance with 35 U.S.C. § 202(c)(6), Applicant hereby states that the invention disclosed in this specification was made with United States of America Federal Government support and the United States of America Federal Government has certain rights in the invention.

TECHNICAL FIELD

The present teaching is related to the field of firefighting nozzles. There exist firefighting nozzles that are designed to dispense ultra-high pressure ("UHP") fluid at a low flow rate, and there exist nozzles that are designed to dispense low-pressure ("LP") fluid at a high flow rate to extinguish fires. These nozzles dispense straight stream and fog pattern sprays. The nozzle disclosed below contains features that allow it to be used with both UHP and LP fluids depending on which pressure mode a user selects. The nozzle according to the present teaching is designed to deliver both straight stream and fog spray patterns in both pressure modes.

BACKGROUND

Firefighting personnel use a multitude of medias to extinguish fires. These fire-extinguishing medias can be fluid, gaseous, solid, or mixtures or emulsions of different phases of media. Examples of fire extinguishing media can be water, foam, dry chemical powder, or inert gases. Most liquid-based firefighting systems can dispense water or other liquid medias including foam with nozzles and equipment designed to aerate the media for making the foam mixture. The most common fire-extinguishing media is water. This is because it is plentiful, inexpensive, versatile, inert, and chemically nonhazardous to humans.

While water is the media most commonly used to extinguish fires, large amounts of water may not be available or prudent to use to extinguish a particular fire. Also, despite the general availability of water, some localities or areas do not have access to reservoirs big enough to provide large amounts of clean water needed to feed a conventional, low-pressure, high-flow firefighting apparatus. In cases where low pressure, high flow water is not available, a firefighting team may choose to use an ultra-high pressure ("UHP") firefighting system. These systems use what is known as ultra-high pressure (e.g., 1100-1500 psi) water at low flow rates (compared to more conventional low-pressure systems) to extinguish a fire. UHP systems use less water than low pressure systems to extinguish similar fires. UHP systems are well suited for extinguishing fires in areas where water must be carried to the fire in a tank or where excessive run-off of water from the extinguishing effort would damage surrounding property. UHP systems can also be more effective than low pressure systems when a fire is large and low pressure systems cannot distribute water to the core burning materials past a front of flames. UHP is also used for fuel pool fire applications, where rapid temperature reduction and low fluid flow rates are essential to extinguish and mitigate flame spread. Further, society has become more sensitive to how efficiently freshwater resources are used. Even when there are sufficient water resources available to extinguish a fire with a low-pressure system and the low-pressure system would be sufficient to extinguish a particular fire without substantial damage to surrounding areas, as explained above, often an UHP system would simply use less water to extinguish the same fire.

A similar argument can be made for the use of aqueous film-forming foams (AFFF). These chemicals are very helpful in preventing re-ignition of pool fires by forming a floating film on top of a flammable liquid pool. The film provides a non-flammable barrier that separates the fuel from the oxygen in the air so re-ignition cannot occur. It has come under recent attention that the chemicals that are used in AFFFs, while extremely effective at fire suppression, are not environmentally friendly. AFFFs are typically of a class of chemicals known as per- and polyfluoroalkyl substances (PFAS), which are persistent in the environment and in the human body, and have been linked to adverse human health effects. By reducing the total water used to fight a fire, UHP systems also reduce the amount of AFFFs that are introduced into the environment, and reduce human exposure to these chemicals.

While UHP systems are well suited to extinguish many fires, there are still cases where large amounts of water are the optimal method to extinguish a fire. These cases can include fires where the base materials require a large amount of cooling such as lithium battery fires in electric passenger cars or where areas surrounding a fire must be cooled quickly to contain a fire.

It is because of at least the above examples that firefighting teams may require the use of both LP and UHP systems, sometimes for the same fire. Therefore, there is a need for a firefighting nozzle that will dispense water in an appropriate pattern at multiple pressures and flow rates. Such a nozzle would need to be usable in a high stress, high risk environment by fire fighters that must devote the majority of their attention to a fire and hazards around them. Further, the nozzle must be usable by personnel that are wearing heavy firefighting gear, including protective gloves that can be saturated with water or other fire extinguishing media. Because of this, the parts of the nozzle must be movable by a user with a wet, gloved hand and also while UHP or LP media is fed to the nozzle. It is the goal of the Applicant to address at least the above issues by the disclosure below.

SUMMARY

The needs set forth herein as well as further and other needs and advantages are addressed by the present embodiments, which illustrate solutions and advantages described below.

The apparatus of the present embodiment includes, but is not limited to the following embodiments.

In one embodiment, the nozzle for dispensing a fire-extinguishing media (e.g., fluid) can have a barrel having a proximal end and a distal end, a passage defined by a first internal surface extending between the distal end and the proximal end, and an orifice defined by a second internal surface at the distal end of the barrel. A stem can be located at least partially in the barrel wherein the barrel is movable in relation to the stem to switch between a low pressure mode, a high pressure mode, and an ultra-high pressure mode. A shaper can be located around an outer surface of the distal end of the barrel, the shaper being movable in relation to the barrel to switch between a low pressure fog mode and a low pressure stream mode. In the firefighting industry, low pressure ("LP"), high pressure ("HP"), and ultra-high pressure ("UHP") refer to specific ranges. According to the National Fire Protection Association, LP is defined as pump pressures up to 500 psi, HP is defined as pump pressures from 500 psi to 1100 psi, and UHP is defined as pump pressure above 1100 psi. The nozzle is designed to work in anywhere between the low pressure end of the pump curve and the ultra-high pressure end of the pump curve.

In one embodiment, the nozzle can have a gap defined by the second internal surface and the stem wherein in the low pressure mode, the barrel can be positioned such that the gap is wider than it is in the high pressure mode. Further, in the high pressure mode, the barrel can be positioned such that the gap is wider than it is in the ultra-high pressure mode. In the ultra-high pressure mode, the barrel can be positioned such that the gap is narrower than it is in the high pressure mode and more so that it is in the low pressure mode.

In one embodiment, the nozzle can have a barrel that is moved in a proximal direction to switch from the ultra-high pressure mode to the low pressure mode, and the barrel is moved in a distal direction to switch from the low pressure mode to the ultra-high pressure mode.

In one embodiment, the nozzle can have a barrel that is movable in relation to the stem by rotating a first portion of the barrel in relation to a second portion of the barrel.

In one embodiment, the nozzle can have a gap where the gap is partially defined by a metering surface of the stem located at a distal end of the stem.

In one embodiment, the metering surface of the stem has a first cross section and a proximal end of the stem has a second cross section. The first cross section is larger than the second cross section in a direction perpendicular to a length of the stem.

In one embodiment, the nozzle can have a low pressure mode where the shaper is movable in a proximal direction to switch from the stream mode to the fog mode, and wherein the shaper is movable in a distal direction to switch from the fog mode to the stream mode.

In one embodiment, the nozzle can have a barrel where the barrel has a front face with a conical surface, and more specifically a concave conical surface, that extends from the orifice.

In one embodiment, the nozzle can have a stream position where a stream of fluid extending from the concave conical surface intersects with the shaper, and in the fog position, the stream of fluid extending from the concave conical surface does not intersect the shaper.

In one embodiment, the nozzle can have a shaper that is connected to the barrel with a cam mechanism. The shaper is switched from the stream mode to the fog mode, and from the fog mode to the stream mode, by rotating the shaper in relation to the barrel and about the cam mechanism.

In one embodiment, the nozzle can have a barrel where the barrel is movable in relation to the stem to switch between the low pressure mode, an ultra-high pressure stream mode, and an ultra-high pressure fog mode.

In one embodiment, the nozzle can have a metering plate that has at least one metering plate orifice.

In one embodiment, the nozzle has a stem that is connected to the metering plate with a mechanical connection.

In one embodiment, the nozzle has a mechanical connection between the stem and the metering plate that allows the stem to wobble within the orifice when fluid passes through the gap.

In one embodiment, the nozzle has a first metering plate and a second metering plate in the passage. The first metering plate and the second metering plate are spaced such that a fluid jet produced by the second metering plate dissipates before the first metering plate.

In one embodiment, the barrel of the nozzle has at least a first barrel piece and a second barrel piece. The first barrel piece has the orifice and contains the stem, the second barrel piece has the metering plate, and the first barrel piece is moved in relation to the stem by rotating the first barrel piece in relation to the second barrel piece.

In one embodiment, the nozzle has a first barrel piece where the first barrel piece moves proximally or distally in relation to the second barrel piece when the first barrel piece is rotated in relation to the second barrel piece.

In one embodiment, the nozzle has a connector at a proximal end of the nozzle for connecting the nozzle to a fluid conduit. The fluid conduit is connected to a fluid reservoir and the nozzle receives fluid from the fluid reservoir via the fluid conduit.

In one embodiment, the nozzle for dispensing a fire-extinguishing media (e.g., fluid) has a barrel that has a proximal end and a distal end, the barrel has a first barrel piece at the distal end of the barrel and a second barrel piece at the proximal end of the barrel, the first barrel piece is rotatable in relation to the second barrel piece. The barrel has a passage defined by a first internal surface that extends between the distal end and the proximal end of the barrel, and an orifice defined by a second internal surface at the distal end of the barrel. The nozzle also has a stem that has a proximal end with a first cross section at least partially in the barrel. The stem has a distal end with a metering surface that has a second cross section at the distal end of the stem, the second cross section is larger than the first cross section in a direction perpendicular to the length of the stem. The nozzle also has a gap defined by the second internal surface of the barrel and the metering surface of the stem. The barrel has a first metering plate proximal to the orifice, the first metering plate having at least one metering orifice. The stem is connected to the first metering plate using a mechanical connection that allows the stem to wobble within the orifice. The barrel has a second metering plate proximal to the first metering plate, the second metering plate has at least one orifice.

The first barrel piece is movable proximally and distally along the stem by rotating the first barrel piece in relation to the second barrel piece whereby the gap is wider in a low pressure mode and narrower in a ultra-high pressure mode. A shaper surrounds the distal end of the barrel and is connected to the barrel with a cam mechanism. The shaper has a front surface facing in the distal direction of the barrel, and the shaper is movable proximally and distally along the barrel between a distal low pressure stream position and a proximal low pressure fog position. The barrel has a concave conical surface in a distal end surface of the first barrel piece.

In the low pressure stream position, the shaper is rotated about the barrel to an extended distal position that intersects a stream of fluid extending from the conical surface, and in the low pressure fog position, the shaper is rotated about the barrel to a proximal position and a stream of fluid extending from the conical surface passes by the shaper in the distal direction of the barrel.

Other embodiments of the apparatus are described in detail below and are also part of the present teachings.

DETAILED DESCRIPTION

The present teachings are described more fully hereinafter with reference to the accompanying drawings, in which the present embodiments are shown. The following description is presented for illustrative purposes only and the present teachings should not be limited to these embodiments.

In compliance with the statute, the present teachings have been described in language more or less specific as to structural and mechanical features. It is to be understood, however, that the present teachings are not limited to the specific features shown and described, since the apparatus, systems, and methods herein disclosed comprise preferred forms of putting the present teachings into effect.

For purposes of explanation and not limitation, specific details are set forth such as particular structures, architectures, interfaces, techniques, etc. in order to provide a thorough understanding. In other instances, detailed descriptions of well-known devices and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant does not intend any of the appended claims or claim elements to invoke 35 U.S.C. 112(f) unless the words "means for" or "step for" are explicitly used in the particular claim.

A notable advantage to the disclosed nozzle is that it can be used with both conventional low-pressure, high-flow firefighting apparatus and ultra-high pressure, low-flow firefighting apparatus. The nozzle can be configured to pair with specific pump and hose combinations that supply both low-pressure, high-flow fluid, and ultra-high-pressure, low-flow fluid depending on the mode in which the pump and nozzle are operated.

Figure 11:
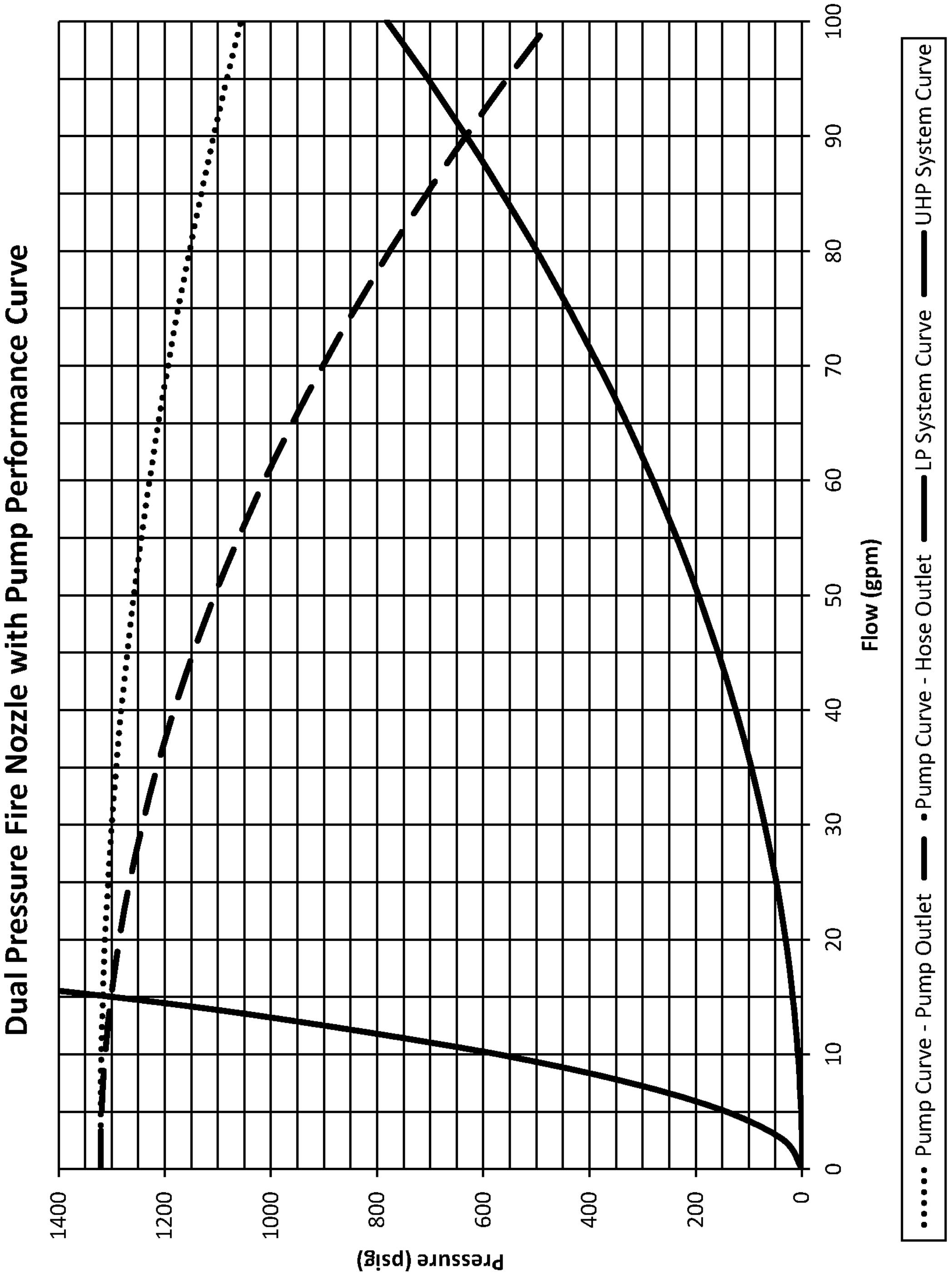
FIG. 11 is an example of a chart showing the pressure versus flow performance of a firefighting pump, also known as a "pump curve" chart.

As is standard for the industry, a pump will have a range of conditions under which it can produce a fluid flow. This range can be represented by a chart showing the flow the pump is capable of at each pressure in the pump's operating range. This is commonly known as a "pump curve." An example of a pump curve chart is provided as FIG. 11. The disclosed nozzle can have an UHP nozzle mode that works with the low-flow, high-pressure end of the pump curve. These operating conditions are represented in FIG. 11 by the point where the "UHP System Curve" and the "Pump Curve-Hose Outlet" meet. The disclosed nozzle can also have a LP mode that works with the high-flow, low-pressure end of the pump curve. These operating conditions are represented in FIG. 11 by the point where the "LP System Curve" and the "Pump Curve-Hose Outlet" curve meet. One way these operating conditions are achieved is through the use of metering plates that have holes through which the fire-extinguishing media (e.g., fluid) must pass. The number and size of the holes in first and second metering plates can be designed to regulate the flow and pressure through the nozzle to match the LP flow conditions that are provided by the pump, including pressure losses through the intended length of hose and fittings that will be used. The size of the gap between the orifice of the barrel and the stem can be designed to regulate the flow and pressure through the nozzle to match the UHP flow conditions that are provided by the pump.

Different pumps and/or flow rates will also require different orifice and stem sizes, but can be accommodated as alternative parts within the same overall nozzle design. By adjustment of the position of a relative distance between a stem and an orifice in a barrel portion of the nozzle, the nozzle can accommodate either a higher flow rate at a low pressure, or it can accommodate a lower flow rate at ultra-high pressure. Further, in low-pressure mode, the nozzle can provide both a fogging spray pattern and a stream spray pattern depending on the position of a shaper around the dispensing end of the nozzle. In UHP mode, the nozzle can provide both a fogging spray pattern and a stream pattern depending on the position of the stem within or protruding from the orifice in the barrel portion of the nozzle.

Figure 1:
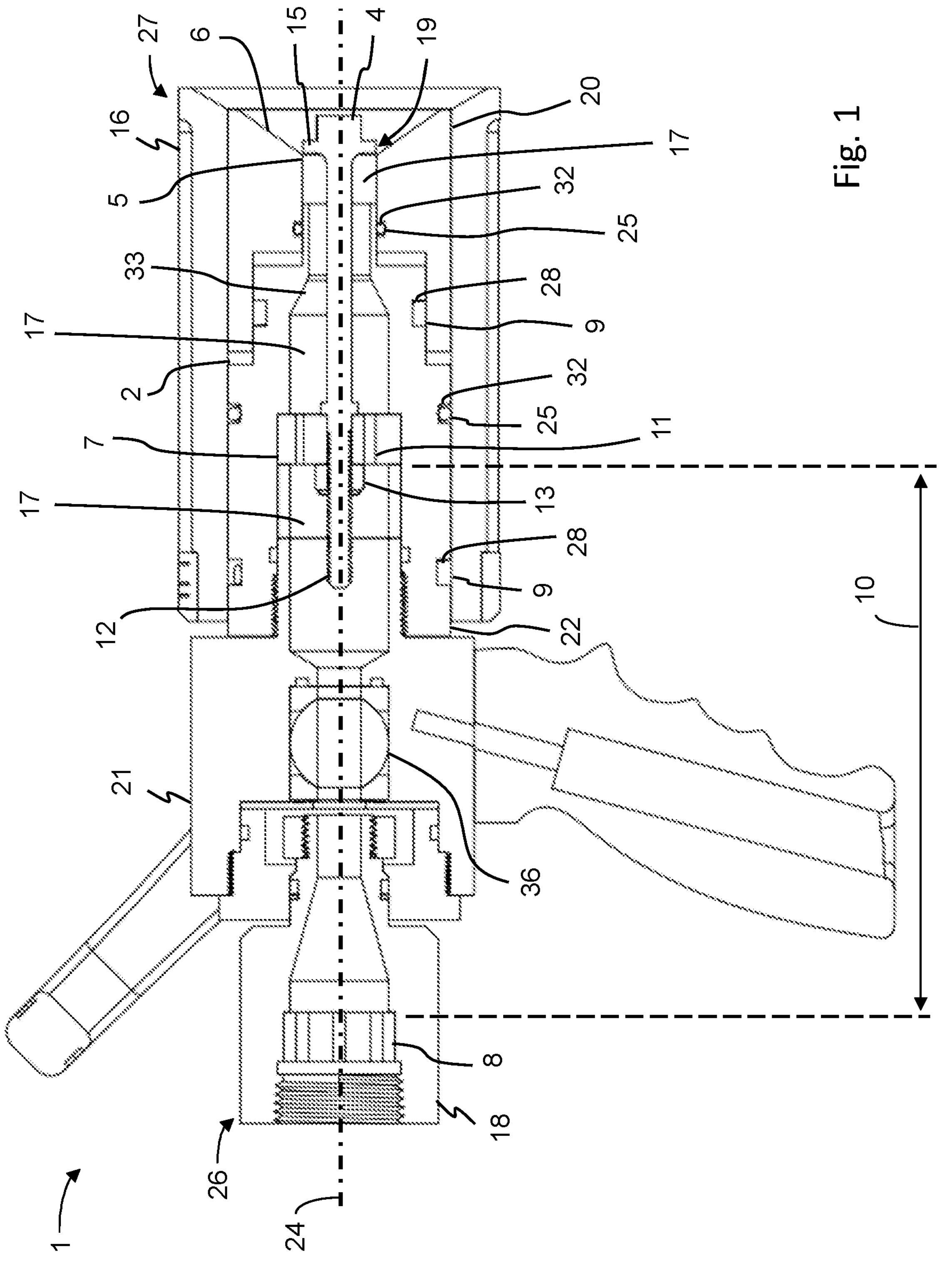
FIG. 1 is a cross sectional view a nozzle according to the present teachings in an UHP fogging mode.
Figure 2:
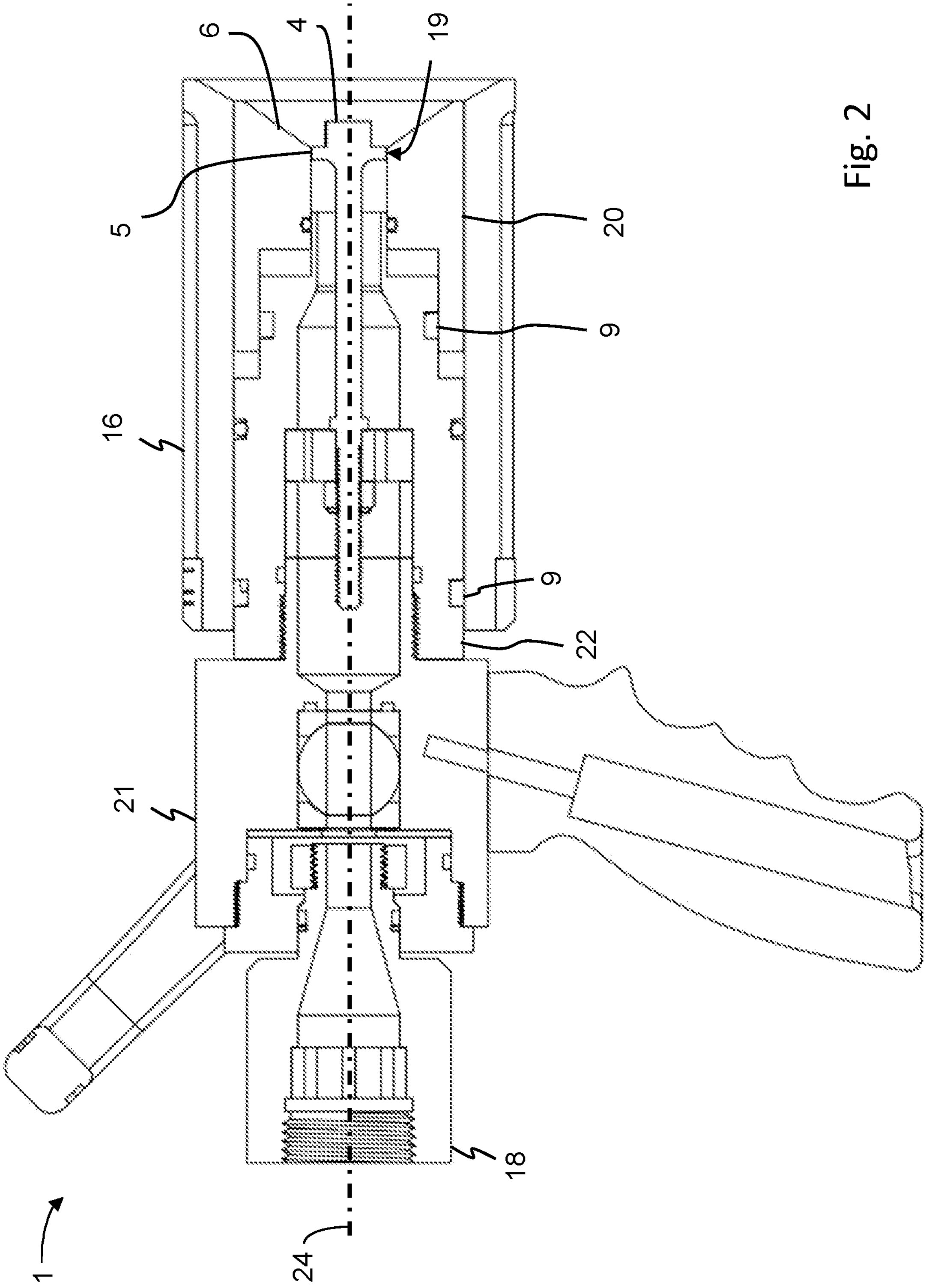
FIG. 2 is a cross sectional view of the nozzle of FIG. 1 in an UHP stream mode.
Figure 3:
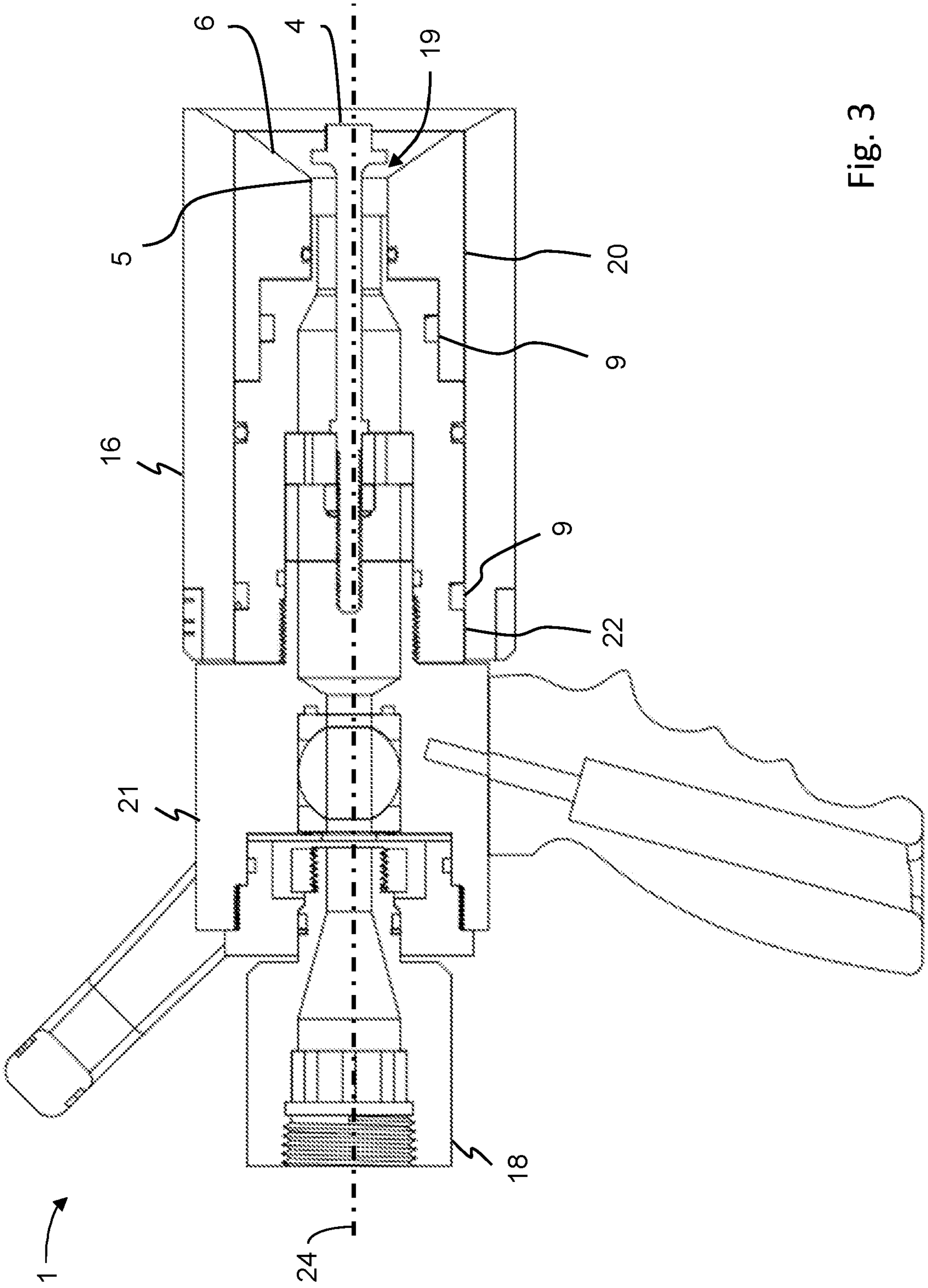
FIG. 3 is a cross sectional view of the nozzle of FIG. 1 in a LP fogging mode.
Figure 4:
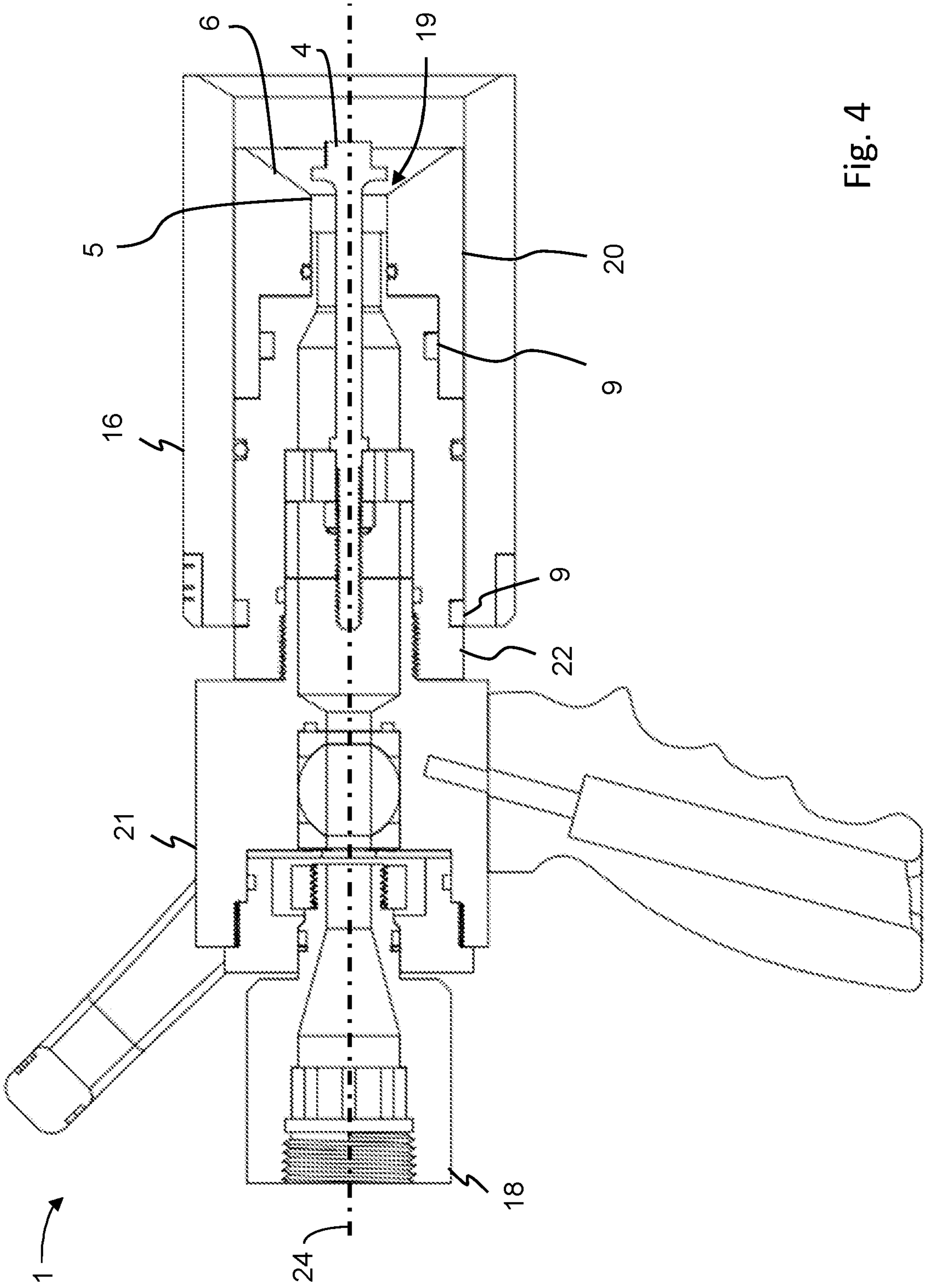
FIG. 4 is a cross sectional view of the nozzle of FIG. 1 in a LP stream mode.

Referring to FIGS. 1-4, an embodiment of the nozzle 1 in UHP and LP and fog and stream configurations is shown. FIG. 1 depicts the nozzle 1 in an UHP fog mode. FIG. 2 depicts the nozzle 1 in an UHP stream mode. FIG. 3 depicts the nozzle 1 in a LP fog mode. FIG. 4 depicts the nozzle 1 in a LP stream mode. The nozzle 1 can have a barrel 2, a stem 4, metering plates 7 and 8, a shaper 16, and a fitting 18.

The barrel 2 serves as a main fluid conduit through which fire-extinguishing media can pass. The nozzle 1 can have a nozzle fluid passage that passes through the nozzle 1 and includes a main fluid passage 17 in the barrel 2. The stem 4 and metering plates 7 and 8 are secured inside of the nozzle fluid passage. The nozzle 1 can have a proximal end 26 designated as an end at which the nozzle 1 connects to a hose, pipe, or other pressurized fluid-carrying conduit. The nozzle 1 can also have a distal end 27 designated as an end of the nozzle 1 where fluid is dispensed into the atmosphere. The barrel 2 can have a longitudinal axis 24 that runs between the proximal end 26 and distal end 27 of the nozzle 1. The longitudinal axis 24 can be parallel or co-axial with an axis running through the center of the main fluid passage 17.

At the proximal end 26 of the nozzle 1, there can be a fitting 18 that facilitates connection of the nozzle 1 with a hose, pipe, or fluid conduit from which fluid is dispensed. The barrel 2 can have an orifice 5 at the distal end 27 of the nozzle 1 and inside of the fluid passage 17. A conical surface 6 can extend radially and distally from the orifice 5 to the distal end 27 of the barrel 2. The barrel 2 does not require an orifice 5 and can have a constant cross section fluid passage 17 throughout.

Figure 12:
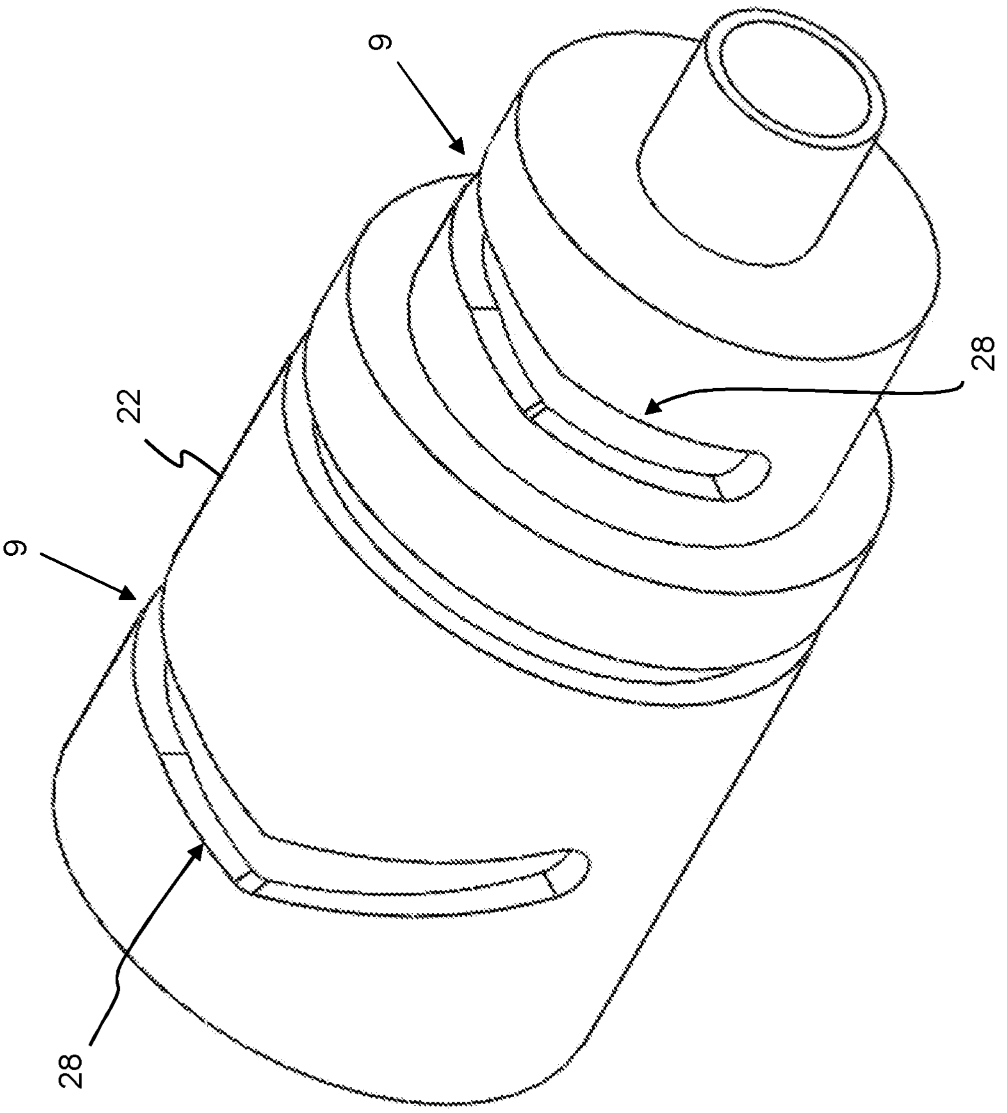
FIG. 12 is an isometric view of a barrel portion of the nozzle of FIG. 1, having groove portions of cam mechanisms to which a movable barrel portion and a shaper can be attached.
Figure 13:
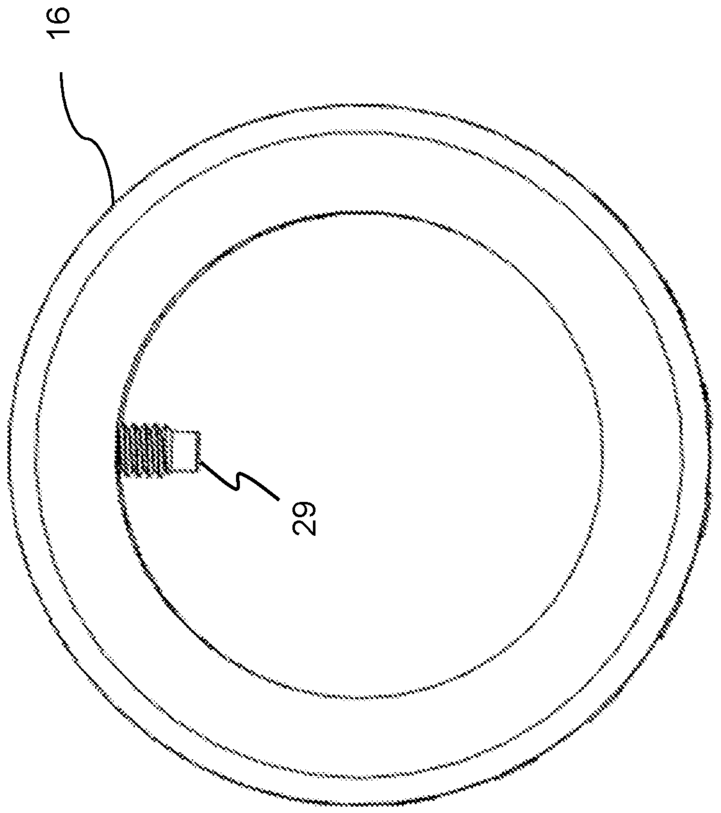
FIG. 13 is a front view of a shaper of the nozzle of FIG. 1 with a protrusion that can interact with a groove of a cam mechanism.

The barrel 2 can have a front barrel portion 20 and a rear barrel portion 22. The front barrel portion 20 can be situated towards the distal end 27 of the nozzle 1 in relation to the rear barrel portion 22. The front barrel portion 20 can be connected to the rear barrel portion 22 using a cam mechanism 9. Referring to FIG. 12, the cam mechanism 9 can have a groove 28 in a circumferential surface of either barrel portions 20 or 22. The cam mechanism 9 can also have a protrusion 29 on a circumferential surface of one of the barrel portions 20 or 22 that fits in the groove 28 in the other barrel portion or the shaper 16 as shown in FIG. 13. The protrusion 29 is shaped and positioned such that when the barrel portions 20 and 22 are assembled, the protrusion 29 is positioned inside of the groove 28 and when the barrel portions 20 and 22 are rotated about their longitudinal axis and in relation to each other, the protrusion travels along the length of the groove 28.

Figure 14:
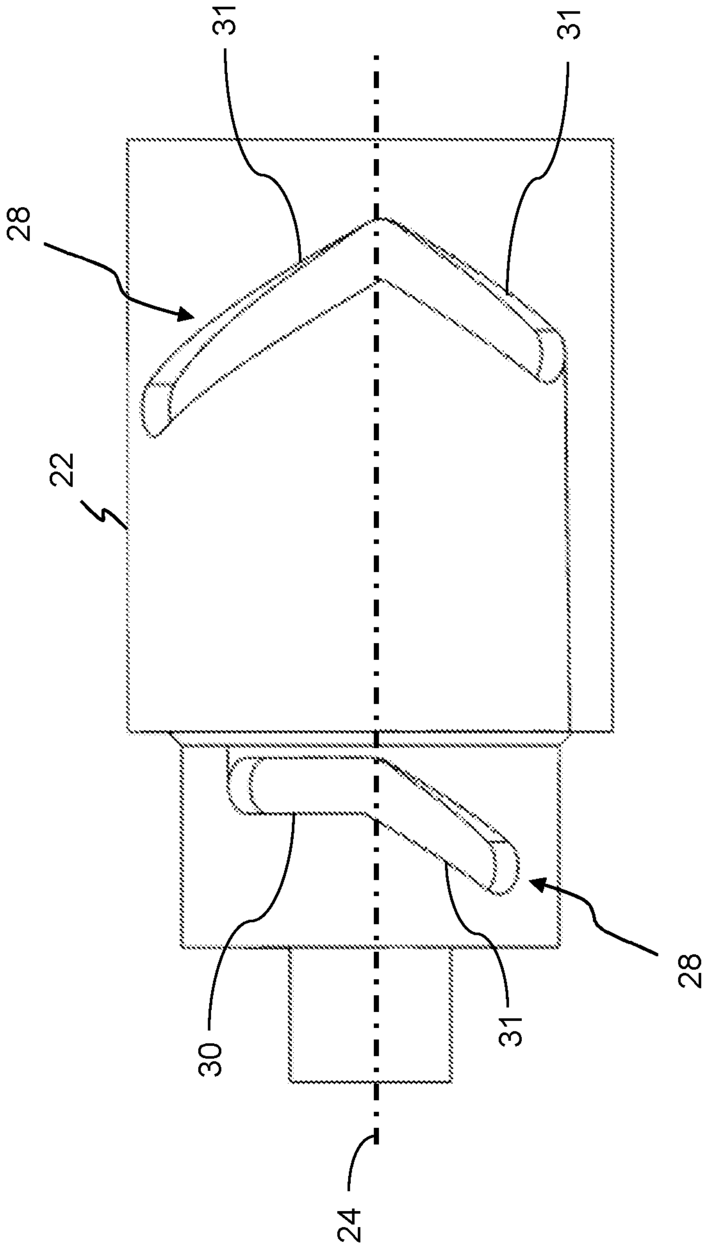
FIG. 14 is a side view of a barrel portion of the nozzle of FIG. 1, having groove portions of cam mechanisms to which a movable barrel portion and a shaper can be attached.

Referring to FIG. 14, the groove 28 can have an annular portion 30 that follows the path of the circumference of a circle perpendicular to the longitudinal axis 24 of the barrel portion in which the groove is designed. The grove 28 can also have a portion 31 that, while traveling around the circumference of a surface of the barrel portion, can also deviate in a direction along the longitudinal axis 24 of the respective barrel portion. The deviation 31 can create a mechanism by which when the barrel portions 20 and 22 are rotated in relation to each other, they move away from each other or closer to each other along the longitudinal axis 24 of the barrel 2. The transition between the annular portion 30 and the deviated portion 31 of the groove 28 can be smooth such that the protrusion 29 can follow the path of the groove 28 with reduced mechanical effort. The protrusion 29 can have any of a set (grub) screw, dowel pin, spring pin, detent, spring-loaded plunger, threaded fastener, shoulder bolt, bar, bearing, or any other device known in the art of a mechanism sliding in and along a groove. Embodiments of the groove 28 can have only deviation portions 31 that are orthogonal to the circumference of the surface of the barrel portion rather than annular portions 30.

The cam mechanism 9 can have multiple protrusions 29 and multiple grooves 28 to distribute forces on the cam mechanism 9 over multiple points or surfaces.

The barrel portions 20 and 22 can have a seal 25 between them such that fluid is contained within the barrel 2. This seal 25 can be any of a gasket, o-ring, or molded sealant. The seal 25 can be accompanied by a corresponding gland, groove, securing element, or adhesive. The seal 25 can consist of an o-ring in a gland 32 that is in an external circumferential portion of the rear barrel portion 22. The external circumferential portion of the rear barrel portion 22 can be sized such that it fits within a circular bore in the front barrel portion 20. The circular bore in the front barrel portion 20 can be sized such that the o-ring is squeezed causing a fluid-tight seal between the front barrel portion 20 and the rear barrel portion 22.

In another embodiment, the seal 25 can consist of an o-ring in a gland 32 that is in an internal circumferential portion of the front barrel portion 20. The external circumferential portion of the rear barrel portion 22 can be sized such that it fits within a circular bore in the proximal end of the front barrel portion 20. The circular bore in the front barrel portion 20 can be sized such that the o-ring is squeezed causing a fluid-tight seal between the front barrel portion 20 and the rear barrel portion 22.

In another embodiment, the front barrel portion 20 can have a protruding external circumferential portion that fits into an internal circumferential portion on the rear barrel portion 22. As with other embodiments, there can be a seal 25 between the barrel portions 20 and 22 and the seal 25 can have an o-ring and groove. The groove can be in either barrel portion 20 or 22.

The barrel 2 and main fluid passage 17 can be cylindrical or any other cross-sectional shape that allows for usability of the nozzle 1 on the end of a hose, pipe, or other fluid conduit. The barrel 2 and the main fluid passage 17 can be concentric or not to facilitate different packaging and use cases. The barrel 2 can be made out of materials including, but not limited to, metals (including but not limited to ferrous or nonferrous metals including stainless steel, coated steel, brass, aluminum, bronze, titanium, copper, magnesium, or alloys including these metals and any other alloying metal known in the art), plastics (including, but not limited to ABS, HDPE, PET, or any other plastic known in the art), composites (including but not limited to fiber reinforced plastics, resins, polymer-based composites, or any other composite known in the art), or any combination of the foregoing known in the art. Construction materials for the barrel 2 can be selected based on specification known in the art for producing a pressure containing nozzle for use on a handline or other common firefighting apparatus, including non-manned devices.

The barrel 2 can have a main fluid passage 17 that is a constant cross section, or a variable cross section moving from the proximal end 26 of the barrel 2 to the distal end 27 of the barrel 2. The main fluid passage 17 can then neck down to a smaller cross section to meet the orifice 5. The necked down portion 33 of the main fluid passage 17 can have a linear decrease in the cross section creating a constant taper to the orifice 5. Other rates of decrease in the cross section of the main fluid passage 17 are possible without deviating from the structure and function of the present disclosure.

As stated above, the barrel can be comprised of two portions 20 and 22. The rear barrel portion 22 can have a portion of the main fluid passage 17 that has a first cross section size that necks down to a smaller second cross section size. The front barrel portion 20 can have a second portion of the main fluid passage 17 that has a cross section similar, equal to, or larger in size to the smaller second cross section. Because the cross section of the main fluid passage 17 does not neck down in the front barrel portion 20, axial forces on the front barrel portion 20 due to fluid flowing through the main fluid passage 17 can be reduced or eliminated. Accordingly, less effort can be required to rotate the front barrel portion 20 in relation to the rear barrel portion 22 when pressurized fluid is flowing through the main fluid passage 17.

The orifice 5 of the barrel 2 is preferably circular, but can be ovular, square, diamond, cat eye (slit), any combination of these shapes, or any other shape through which a stream of fluid can pass. The shape of the orifice 5 affects the shape of the stream of fluid dispensed from the nozzle 1 and can be selected based on the stream shape required for a particular application.

Figure 6:
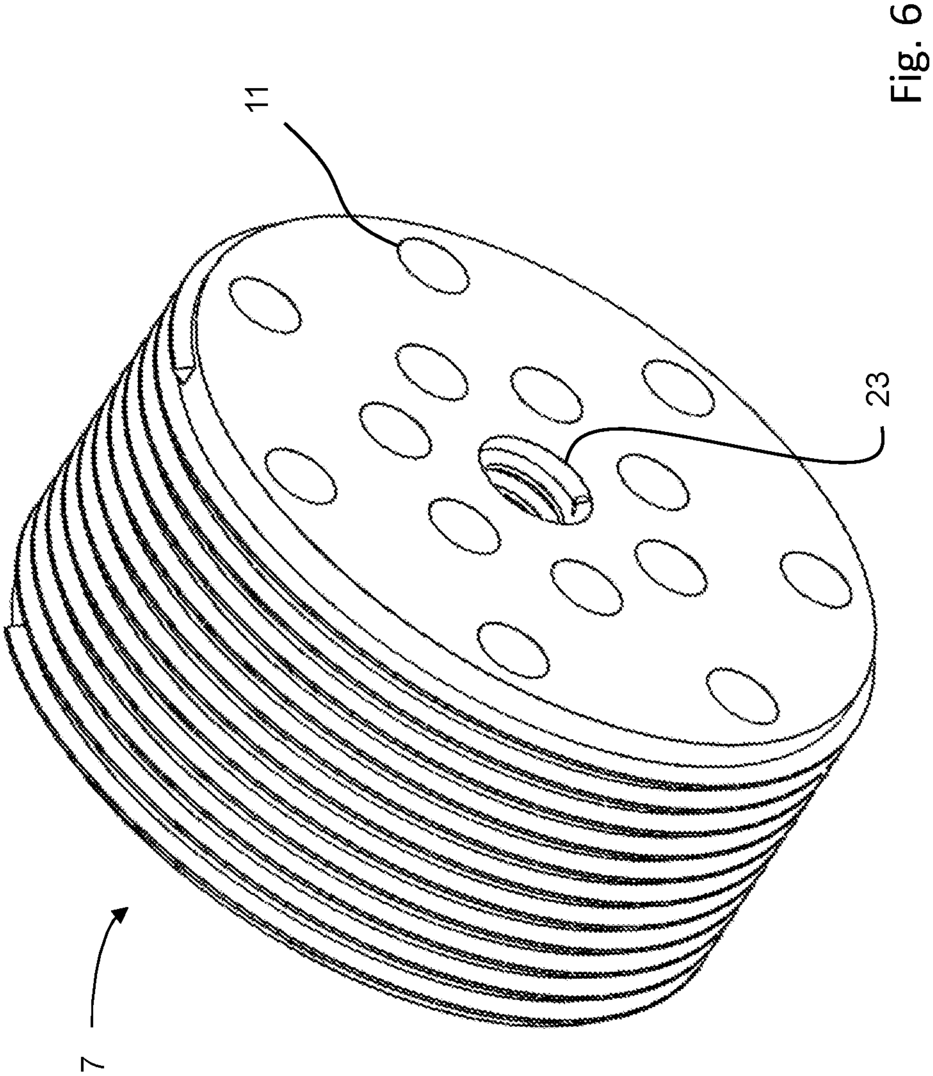
FIG. 6 depicts a first metering plate of the nozzle of FIG. 1.
Figure 7:
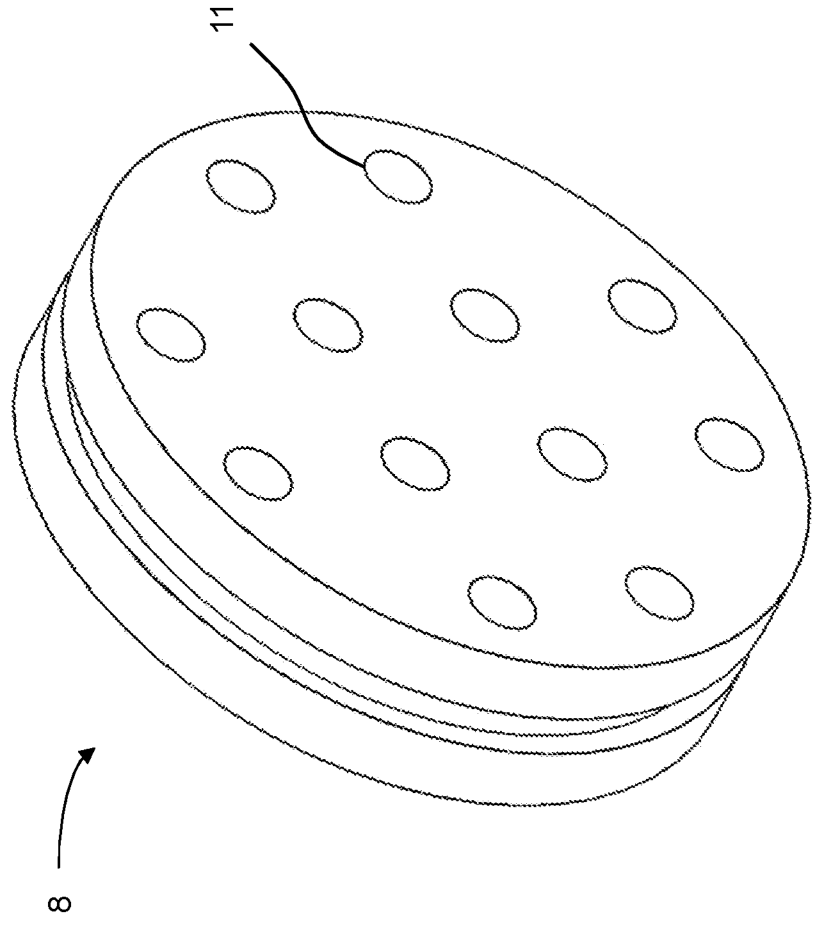
FIG. 7 depicts a second metering plate of the nozzle of FIG. 1.
Figure 8:
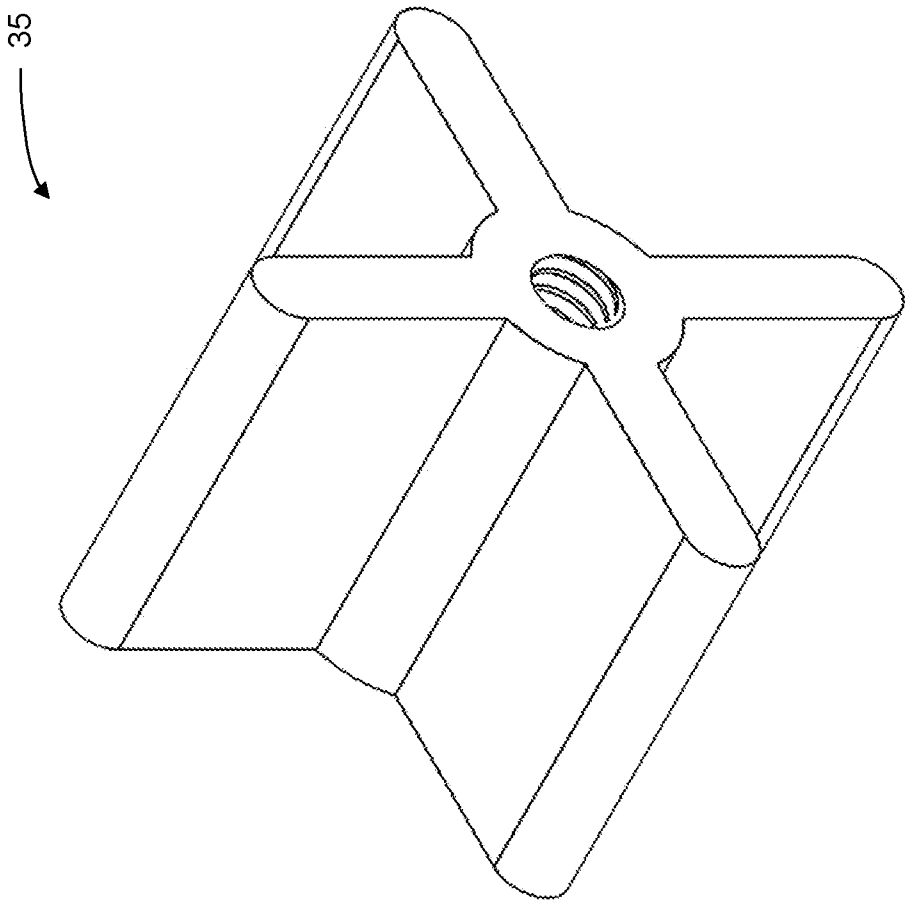
FIG. 8 depicts a connector of the nozzle of FIG. 5.
Figure 9:
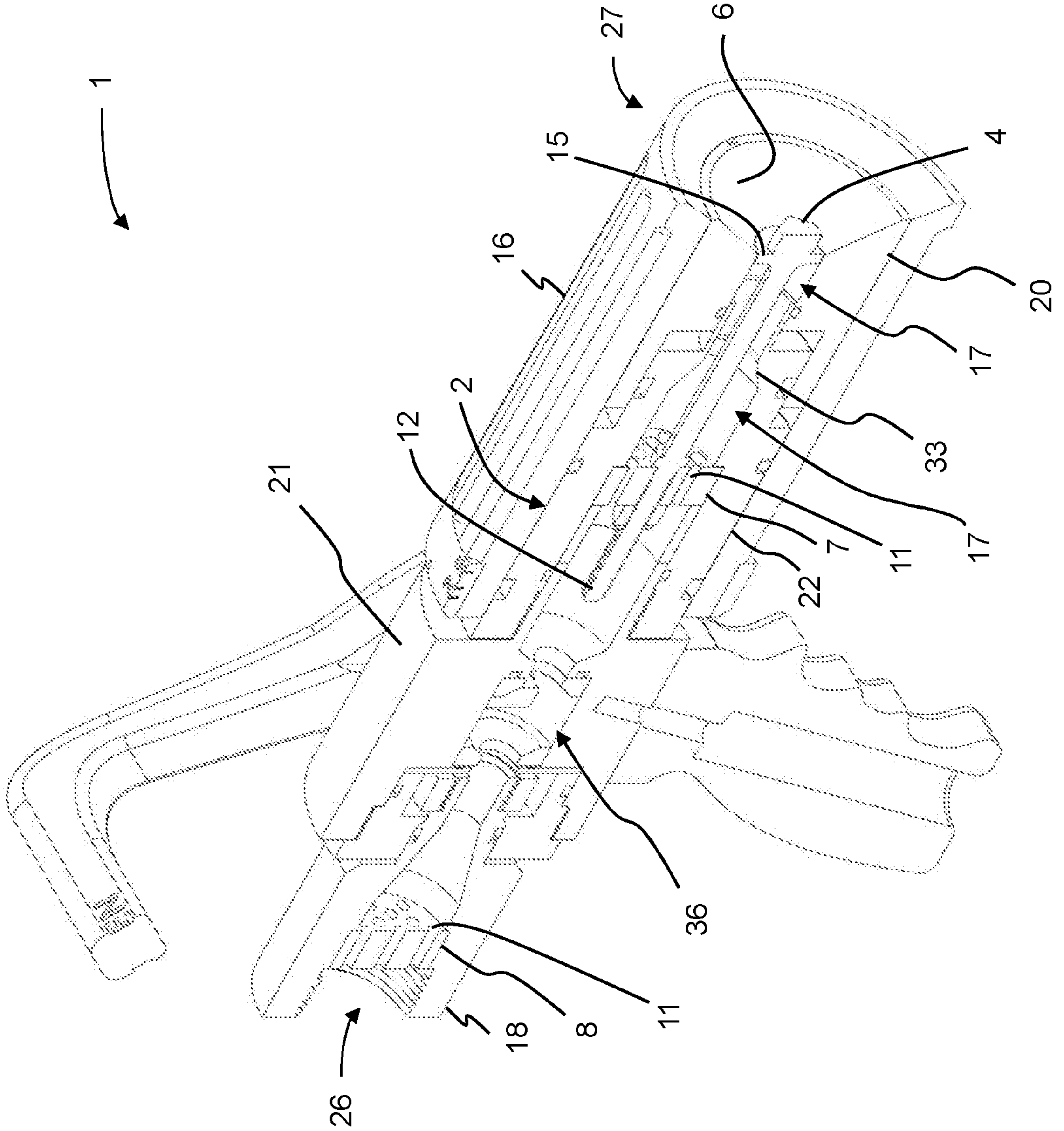
FIG. 9 is an isometric, cross sectional view of the nozzle according to the present teachings.
Figure 10:
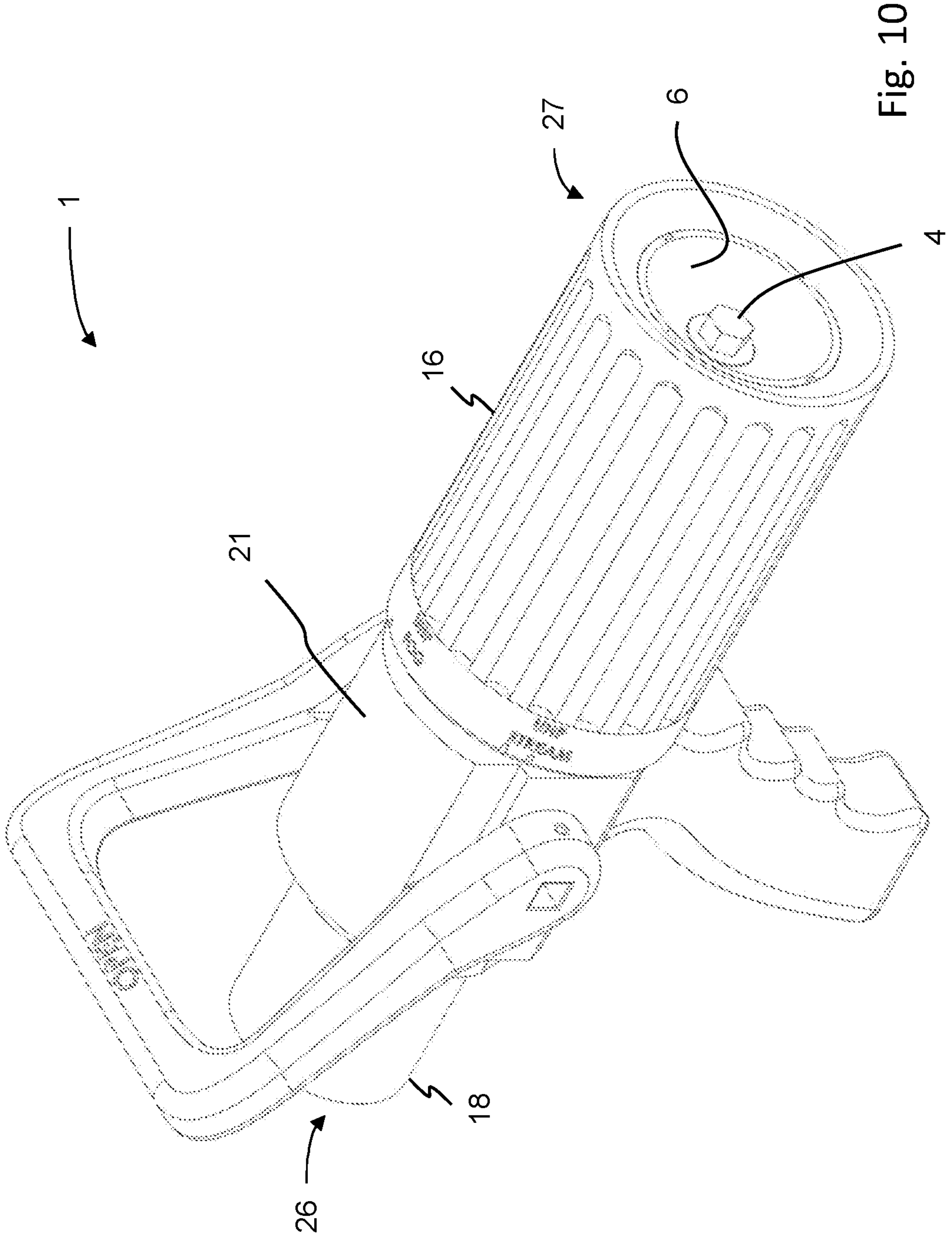
FIG. 10 is an isometric view of the nozzle of FIG. 9.

The nozzle 1 can have a first metering plate 7 and a second metering plate 8 secured in the path of fluid flowing through the main fluid passage. The second metering plate can be mounted in the connector 18 or in any other spot along the flow path of the fluid through the nozzle 1. The first metering plate 7 and the second metering plate 8 can have multiple plate orifices 11 that are through holes in the metering plate 7 or 8 and allow fluid to pass through the metering plate 7 or 8. As illustrated in FIGS. 6-7, the metering plate 7 or 8 can have multiple plate orifices 11 in circular patterns. A metering plate 7 or 8 can have multiple concentric patterns of metering orifices 11. The metering plates 7 and 8 can have the same or different metering orifice 11 patterns. The metering orifices 11 of the metering plates 7 or 8 can be the same size or different sizes between the metering plates 7 and 8 and between different metering orifices 11 on the same plate 7 or 8. The orifices 11 in the metering plates 7 and 8 are sized and placed such that they limit the fluid pressure after each of the metering plates 7 and 8 at high flow rates, while effectively not limiting the fluid pressure after the metering plates 7 and 8 at low flow rates. The proximal metering plate 8 and/or the distal metering plate 7 can act as a debris strainer to prevent foreign object debris from clogging the nozzle 1, including the gap 19 between the stem 4 and the orifice 5. The size and number of orifices 11 in the metering plates 7 and 8 are determined by the flow and pressure desired for LP operation, which is determined from the operating characteristics of the pump and pressure loss through the hose. With higher flows or pressure, more metering plates may be desirable to prevent cavitation within the nozzle 1 during LP operation or to create the desired pressure drop through the nozzle 1.

The metering plates 7 and 8 can be secured to the inner wall of the barrel 2, connector 18, or any other component of the nozzle 1, in the main fluid passage 17. The metering plates 7 and 8 can be secured to an inner wall by fasteners including, screws, bolts, dowels, pins, adhesives, screw threads, press fits, welds, peens, stakes, or any other method or device known in the art for fastening solid materials together. Furthermore, the metering plates 7 and 8 can be secured in the main fluid passage 17 by flanges protruding from the inner walls of the main fluid passage 17 such that fluid pressure presses the metering plates 7 and 8 against the flanges while fluid flow is present. When fluid flow is not present, the metering plates 7 and 8 can move freely distally and proximally in relation to the nozzle 1. The metering plates 7 and 8 can be manufactured as one piece with the barrel 2 or any other component of the nozzle 1 in processes including, but not limited to, casting, printing, forging, molding, machining, or any other process known in the art of manufacturing. The metering plates 7 and 8 can include a sealing device around the outer perimeter of the metering plate 7 or 8 to seal against the inner wall of the main fluid passage 17 of the nozzle 1. The sealing device can include, but is not limited to, an o-ring, gasket, RTV material sealing bead, UV-curing sealing bead, heat-curing sealing bead, or any other joint or device known in the art of fluid-tight sealing. The aforementioned seals can be made of materials including, but not limited to, elastomer, metal, polymer, fiber, any combination of the aforementioned materials, or any other material known in the art for sealing device materials.

The metering plates 7 and 8 can be made from materials including, but not limited to, metals (including but not limited to ferrous or nonferrous metals including stainless steel, coated steel, brass, aluminum, bronze, titanium, copper, magnesium, or alloys including these metals and any other alloying metal known in the art), plastics (including, but not limited to ABS, HDPE, PET, or any other plastic known in the art), composites (including but not limited to fiber reinforced plastics, resins, polymer-based composites, or any other composite known in the art), or any combination of the foregoing known in the art.

The metering plates 7 and 8 can be secured to the inside of the main fluid passage 17 with a space 10 between them. The orifices 11 of the metering plates 7 and 8 can be staggered such that a jet of fluid passing through the second metering plate 8 is directed to a portion of the first metering plate 7 between or outside of an orifice 11 of the first metering plate 7. The distance between the metering plates 7 and 8 can be approximately 10 times the diameter of the orifices 11. The distance between metering plates 7 and 8 can be greater or less than 10 times the diameter of the orifices depending on the pressure, flow, and/or media needs of the nozzle 1.

The stem 4 can be inside of the orifice 5, and the orifice 5 can be movable distally and proximally in relation to the stem 4. The stem 4 serves as a metering device to limit the flow of fluid through the orifice 5. Metering is accomplished by movement of the orifice 5 proximally and distally along the length of the main fluid passage 17 or nozzle 1 in order to increase or decrease a gap 19 between the outer surface of the stem 4 and the inner surface of the orifice 5. The section of the stem 4 that is in close proximity to the orifice can be called a metering portion 15. The metering portion of the stem 4 can protrude from the distal surface of the barrel 2 (as in UHP fog, LP fog, and LP stream modes shown in FIGS. 1, 3, and 4, respectively), be positioned inside of the orifice 5 (as in UHP stream mode shown in FIG. 2), or be positioned proximally from the orifice 5. The metering portion of the stem 4 can have a portion with a larger cross section and the rest of the stem 4 can have a smaller cross section portion inside of the barrel 2.

Figure 15:
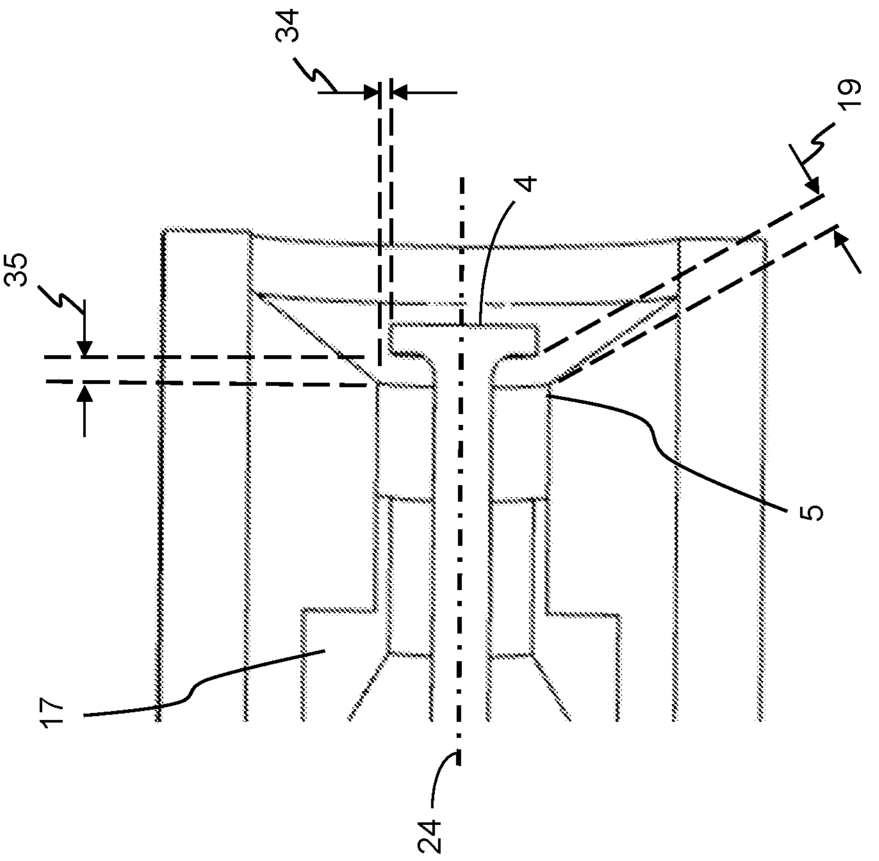
FIG. 15 is a side sectional view of a distal portion of the nozzle of FIG. 1, having a stem within a cavity of a movable barrel portion.

The gap 19 is the smallest distance between the stem 4 and the orifice 5 that fluid must pass through to exit the nozzle 1. Referring to FIG. 15, the gap 19 can have at least two parameters, a radial gap 34 and an axial gap 35. The radial gap 34 can be the distance from the outer circumference of the metering portion of the stem 4 to the inner circumference of the orifice 5 as measured along the direction extending perpendicularly from the longitudinal axis 24 of the stem 4 or main fluid passage 17. The axial gap 35 can be the distance measured from the circumference of the metering portion of the stem 4 to the circumference of the orifice 5 as measured along the direction of the longitudinal axis 24 of the stem 4 or the main fluid passage 17.

Referring to FIG. 1, the nozzle 1, in an UHP, low-flow fog mode is shown. The stem 4 is positioned in the barrel 2 and the metering portion is protruding distally from the orifice 5 such that a gap 19 between the perimeter of the metering portion and the inner surface of the orifice 5 is small. In this position, the gap 19 between the metering portion of the stem 4 and the orifice 5 can have both a radial gap 34 component and an axial gap 35 component resulting in a stream that travels both axially and radially from the orifice 5. In some embodiments the radial component of the gap 19 can be approximately 0.007". In some embodiments of a nozzle 1 in UHP fog mode, the axial gap between the stem 4 and the orifice 5 can be 0.005". In some embodiments of a nozzle 1 in LP mode, the axial gap between the stem 4 and the orifice 5 can be 0.125". In some embodiments, the ID of the orifice 5 can be 0.750"

Referring to FIG. 2, the nozzle 1, in an UHP, low-flow stream mode is shown. The stem 4 is positioned in the barrel 2 and the metering portion is positioned within the orifice 5 such that there is no axial component to the gap 19 between the metering portion of the stem 4 and the orifice 5. Such a configuration forces UHP fluid from the distal end of the nozzle 1 in a direction parallel or substantially parallel to the longitudinal axis 24 of the nozzle 1. The nozzle 1 is converted from the UHP fog mode to UHP stream mode by rotating the front barrel portion 20 about the longitudinal axis 24 and the cam mechanism 9, and in relation to the rear barrel portion 22. As stated above, this rotation results in the front barrel portion 20 being moved distally in relation to the nozzle 1 and rear barrel portion 22.

Referring to FIG. 3, the nozzle 1 in a LP, high-flow fog mode is shown. The stem 4 is positioned outward distally from the orifice 5 such that the gap 19 between the perimeter of the metering portion of the stem 4 and the inner surface of the orifice 5 is larger than in the UHP mode. The orifice 5 can be positioned distally and proximally by a cam mechanism 9 by which a front barrel portion 20 is rotated about the longitudinal axis 24 of the nozzle 1 and relative to a barrel rear portion 22. As a result of this rotation, the front barrel portion 20 is moved proximally or distally in relation to the stem 4 and/or the rear barrel portion 22. Other methods for moving the front barrel portion in relation to the barrel rear portion 22 include screw thread, cam action, rack and pinion gear, lever action, or any other method known in the art for moving an object in a linear direction. An embodiment of the cam mechanism 9 is also described above in this specification.

Referring to FIG. 4, the nozzle 1, in a LP, high-flow stream mode is shown. The stem 4 is positioned outward distally from the orifice 5 such that the gap 19 between the perimeter of the metering portion of the stem 4 and the inner surface of the orifice 5 is larger than in the UHP mode. The relative position between the stem 4 and the orifice 5 can be in the same position as in the LP fog mode, or a different position. Accordingly, the gap 19 in a LP fog position can be the same as that of a LP stream position.

To change the nozzle 1 from a LP fog mode to a LP stream mode, a shaper 16 can be moved distally in relation to the nozzle 1 and the front barrel portion 20. To achieve this, the shaper 16 can be rotated about the longitudinal axis 24 and in relation to the front barrel portion 20. This rotation can cause the shaper 16 to be moved distally in relation to the nozzle 1 and the front barrel portion 20. The shaper 16 can be connected to the front barrel portion 20 by a cam mechanism 9. An embodiment of the cam mechanism 9 is described above in this specification.

To change the nozzle 1 from the LP stream mode to the LP fog mode, the shaper 16 can be moved proximally in relation to the front barrel portion 20 by rotating the shaper 16 in the opposite direction as to move it in the distal direction.

Figure 5:
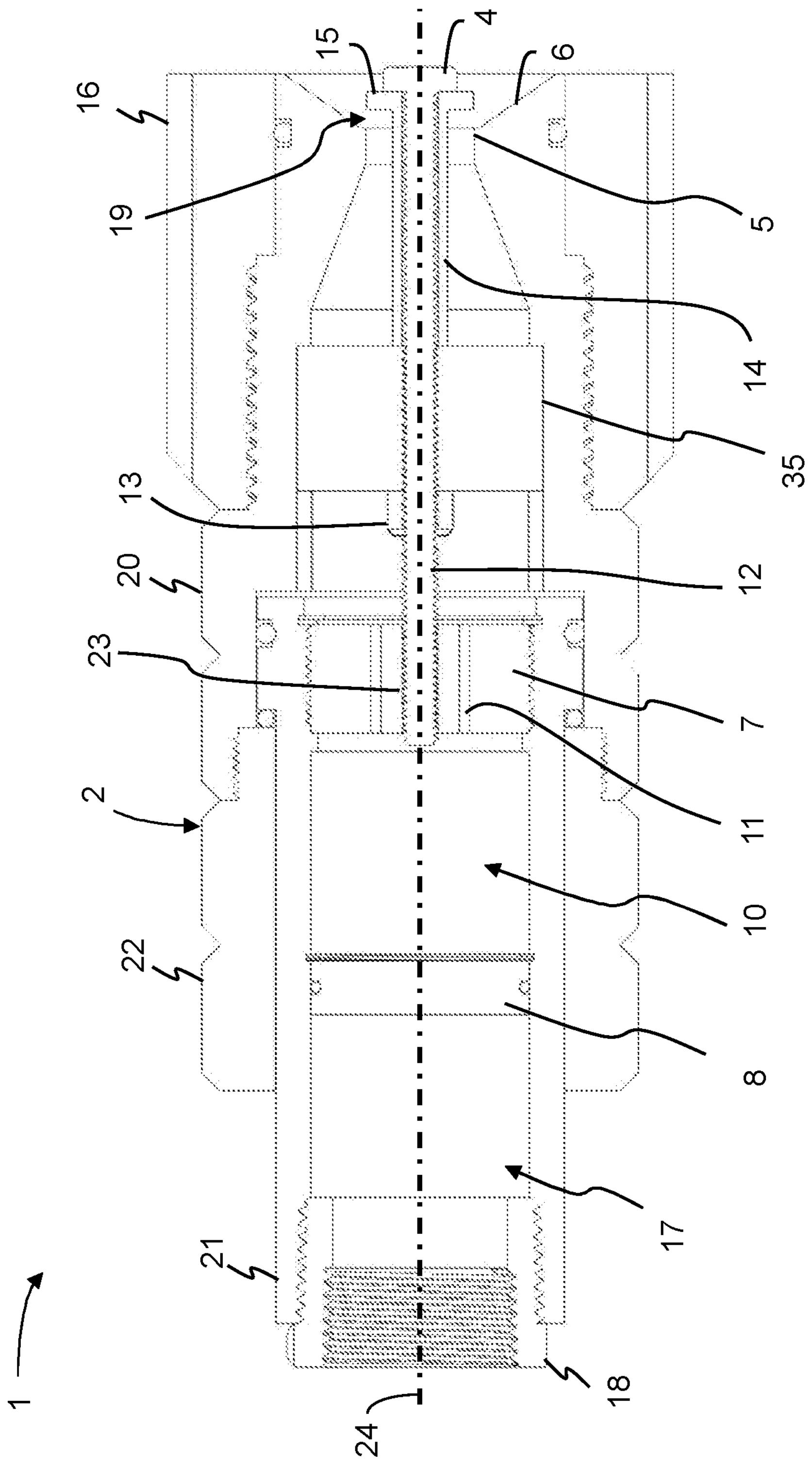
FIG. 5 is a cross sectional view of a nozzle according to the present teachings including first and second barrel portions.

Referring to FIG. 5, in one embodiment, the stem 4 can be moved within the barrel 2 and orifice 5 by use of a screw thread on a threaded section 12. The stem 4 can have a screw thread that is threaded into the first metering plate 7 at threaded hole 23. Then the stem 4 is rotated in relation to the metering plate 7, the stem 4 moves in the axial direction of the stem 4 and the screw thread. The first metering plate 7 can be made of, infused with, or coated with materials that reduce the coefficient of friction between the threaded hole 23 in the first metering plate 7 and the threaded section 12 of the stem 4. Additionally, the threads of threaded hole 23 can be made from, infused with, or coated with a different material from the rest of the first metering plate 7. Threaded hole 23 composition or coating materials can include metals (including but not limited to ferrous or nonferrous metals including stainless steel, coated steel, brass, aluminum, bronze, titanium, copper, magnesium, or alloys including these metals and any other alloying metal known in the art), plastics (including, but not limited to ABS, HDPE, PET, or any other plastic known in the art), composites (including but not limited to fiber reinforced plastics, resins, polymer-based composites, or any other composite known in the art), self-lubricating material including, PTFE, polypropylene, oil-impregnated metals, oil-impregnated plastics, low-friction ceramic, self-lubricating materials, any combination of these materials, or any other material known in the art to reduce friction between surfaces, or any combination of the foregoing known in the art. Additionally, the threaded section 12 can be made of, infused with, or coated with similar coefficient of friction-reducing materials.

In one embodiment, the stem 4 can be rotated in relation to the first metering plate 7 by rotating a portion of the barrel 2 enclosing the stem 4 in relation to a portion of the barrel 2 enclosing the first metering plate 7. As stated, the barrel 2 can be made of multiple portions containing the components of the nozzle 1. In this embodiment, the portion of the barrel 2 containing the stem 4 can be the front barrel portion 20 and the portion of the barrel 2 containing the metering plate 7 can be the barrel upstream tube 21.

In one embodiment, the stem 4 can be moved distally and proximally by threading into and out of a first metering plate 7. As stated, the stem 4 is rotationally fixed to the front barrel portion 20 by the connector 35. The connector 35 can move distally and proximally along the main fluid passage 17 in the front barrel portion 20. Referring to FIG. 5, one embodiment is a connector 35 with a cross-shaped cross section and the main fluid passage 17 having grooves into which the tips of the cross of the connector 35 fit and slide along as the connector 35 and the stem 4 are moved distally and proximally along the front barrel portion 20. A jam nut 13 can be threaded on to the stem 4 and torqued against the connector 35 to rotationally fix the connector 35 with the stem 4. Alternatively, an adhesive or thread locker can be used to fix the threads of the connector 35 and the stem 4 together. Further, other thread-fixing methods known in the art can be used to fix the connector 35 and the stem 4 together including, but not limited to, pinning, a set screw, peening, welding, keying, or any combination of these methods. Also illustrated in FIG. 5 is a longitudinal axis 24 from connector 18 to the distal end of the nozzle 1.

The stem 4 can also have a metering sleeve 14. The metering sleeve can also have a metering surface 15. The metering sleeve 14 can be made out of metal, plastic, resin, composite, or any other material known in the art.

The front barrel portion 20 and the barrel upstream tube 21 can be connected such that they rotate in relation to each other about the main fluid passage 17. The joint between the front barrel portion 20 and the barrel upstream tube 21 must be designed such that under both UHP and LP, a user can rotate the barrel portions 20 and 21 in relation to each other. This joint can be designed such that a low friction surface is placed between the barrel portions including, but not limited to, ball bearings, sleeve bearings, thrust bearings, or fluid cushioning. The bearings can be made out of materials including, but not limited to, steel, stainless steel, plastic, polymers, composites, wood, self-lubricating plastics, self-lubricating polymers, resins, or any other material known in the art of bearing materials.

The threads of the first metering plate 7 can be made of or coated in a self-lubricating material including, PTFE, polypropylene, oil-impregnated metals, oil-impregnated plastics, low-friction ceramic, self-lubricating materials, any combination of these materials, or any other material known in the art to reduce friction between surfaces. This helps lower the force required to rotate the stem 4 and transition from LP to UHP mode and vice versa. This is accomplished by lowering the coefficient of friction between the threaded section 12 of the stem 4 and the threaded hole 23 of the first metering plate 7.

The front barrel portion 20 can have a connector 35 by which the stem 4 is rotatably fixed to the front barrel portion 20. The connector 35 can have a thread corresponding to a thread on the stem 4. A jam nut 13 can be used to rotatably fix the connector 35 to the stem 4. The connector 35 can slide proximally and distally in the front barrel portion 20 or in other embodiments, the barrel 2.

The barrel 2 can have a cone-shaped surface 6 extending distally and radially from the orifice 5. This cone-shaped surface 6 is shaped such that a fluid passing through the gap 19 between the barrel 2 and the stem 4 travels outward from the orifice 5 and stem 4 in a wide, fogging spray pattern. The included angle of this cone-shaped surface 6 can be in the range of 80-160 degrees, but can preferably be in the range of 100-120 degrees. Additionally, the included angle of the cone-shaped surface 6 can be specified based on the desired angle of the spray pattern of the dispensed fluid. A smaller included angle will produce a narrower spray pattern and a larger included angle will produce a wider spray pattern. The optimum angle for both UHP flow and LP flow is also considered in the specification of the included angle of the cone-shaped surface 6.

Referring to FIGS. 1-4, a shaper 16 can surround the distal end of the barrel 2 of the nozzle 1. The shaper 16 can move proximally and distally along the barrel 2. Referring to FIG. 4, the shaper 16 is shown in the distal position, also called the LP stream position. The shaper 16 can protrude beyond the end of the barrel 2 and into the flow path of the fluid dispensed along the cone-shaped surface 6. In the LP stream position, the inner wall of the shaper 16 directs the fluid dispensed along surface 6 into a straighter stream direction parallel to the length of the nozzle 1.

Referring to FIGS. 1, 2, and 3, the shaper 16 is shown in the proximal position, also called the fog position in LP mode. The position of the shaper 16 in UHP mode can be irrelevant to the flow of UHP fluid as the UHP fog and stream mode fluids do not contact the shaper 16 in either the proximal or distal shaper positions. In the fog position, the shaper 16 allows fluid traveling out of the orifice 5 and along the conical surface 6 to continue radially outward from the orifice 5 and proximally to the shaper 16, the fluid forming a cone-like shape of dispensed fluid. The shaper 16 can be moved along the barrel 2 by methods including, but not limited to, screw thread, cam action, lever actuation, or any other method known in the art for moving an object linearly. The shaper 16 can be moved independent of the front barrel 20 or simultaneously with the front barrel 20.

The proximal end of the nozzle 1 can have a fitting 18 for connecting the nozzle 1 to a hose, pipe, or other fluid conduit, as shown in FIGS. 1-4. This fitting 18 can be a releasable connection including threads (including straight or tapered thread), bayonet, push-to-connect, v-band, gasket flange and bolts, or any other fluid conduit connection known in the art. The nozzle 1 can also be non-releasably connected to a hose or pipe by non-releasable methods including welding, soldering, brazing, adhesion using adhesives, or any other method known in the art for non-releasably joining materials.

A practical embodiment of the disclosed apparatus is described below.

Referring to FIG. 1, the nozzle 1 has a front barrel portion 20, barrel upstream tube 21, barrel rear portion 22, stem 4, nut 13, shaper 16, first metering plate 7, second metering plate 8, and hose fitting 18.

The front barrel portion 20 has a main fluid passage 17 that runs through the front barrel portion 20. The front barrel portion 20 and main fluid passage 17 are generally round in cross section. The front barrel portion 20 has a proximal end and a distal end, the distal end having an orifice 5 through which fluid is dispensed and the proximal end where fluid enters the front barrel portion 20. The orifice 5 is the same cross section as the distal fluid passage opening in the rear barrel portion 22. This is to reduce the amount of axial force by fluid passing through the nozzle 1 on the front barrel portion 20. The front barrel portion 20 has a distal tapered portion 6 that abuts the orifice 5. The distal tapered portion 6 is a surface by which fluid is guided into a wide or fogging spray pattern once it exits the orifice.

The rear barrel portion 22 has a proximal tapered portion 33 that is the transition of the fluid passage 17 from a larger cross section to a smaller cross section of the front barrel portion 20. The proximal tapered section facilitates a smooth transition for the flow from a wider main fluid passage to the smaller orifice 5.

A stem 4 is oriented in the orifice 5 of the front barrel portion 20. The stem 4 is made from a threaded shaft with a larger metering diameter 15 in close proximity to the orifice 5. The orifice 5 and the front barrel portion 20 are movable proximally and distally in relation to the stem 4 such that a gap 19 of changeable width is formed between the metering portion 15 of the stem 4 and the inner surface of the orifice 5. In UHP mode, the gap 19 between the outer surface of the metering surface 15 of the stem 4 is narrow, only a fraction of the diameter of the orifice 5, while in LP mode, the gap 19 is larger than in the UHP mode. There is an axial gap between the metering portion 15 and the orifice 5 when the nozzle 1 is in the UHP fog mode, while there is only a radial gap when the nozzle 1 is in the UHP stream mode. The gap 19 in UHP mode can be approximately 0.007" wide in fog or stream mode. In UHP mode, the metering portion 15 of the stem 4 can be entirely inside of the orifice 5 (as in the stream mode) or distal to the orifice 5 (as in the fog mode).

The orifice 5 with the front barrel portion 20 can be moved distally and proximally in relation to the stem 4 by rotating the front barrel portion 20 in relation to the rear barrel portion 22 along a cam mechanism 9. The stem 4 is fixed to the first metering plate 7 by a nut 13. In other embodiments, the stem can be connected to the first metering plate 7 by a threaded connection, welding, press fit, peening, adhesive, brazing, soldering, or any other method known in the art for joining materials.

To change the nozzle 1 from an UHP fog mode as in FIG. 1, to an UHP stream mode, as in FIG. 2, the front barrel portion 20 is rotated clockwise in relation to the rear barrel portion 22 along the cam mechanism 9. This rotation moves the front barrel portion 20 in a distal direction away from the rear barrel portion 22 such that the metering portion 15 of the stem 4 is inside of the orifice 5. To change the nozzle 1 from an UHP fog mode to a LP mode, the front barrel portion 20 is rotated counterclockwise in relation to the rear barrel portion 22 along the cam mechanism 9. This rotation moves the front barrel portion 20 in a proximal direction towards the rear barrel portion 22 such that the metering portion 15 of the stem 4 is positioned further distal of the orifice 5.

A fluid stream entering the nozzle 1 can contain debris large enough to clog the gap 19, thus preventing a uniform and complete spray pattern from the nozzle 1. To prevent debris from blocking the gap 19 between the stem metering surface 15 and the orifice 5, there can be a clearance between the stem 4 and the other components of the nozzle 1. This clearance can allow the stem 4 to "wobble" within the orifice thereby allowing debris that would become caught in the gap 19 to pass through an enlarged portion of the gap 19 when the stem has "wobbled" to one side of the orifice 5. The amplitude of this wobble can be up to equal to or less than the width of the gap 19 when the stem 4 is centered in the orifice 5.

The barrel upstream tube 21 contains a ball valve 36 for controlling fluid flow through the nozzle 1. The barrel upstream tube 21 has a main fluid passage 17 corresponding to the main fluid passage 17 in the front barrel portion 20 and the rear barrel portion 22. The barrel upstream tube 21 has a proximal end and a distal end. The distal end is adjacent to the proximal end of the rear barrel portion 22. The second metering plate 8 is positioned in a fitting 18, proximally from the first metering plate 7 in the rear barrel portion 22. Both metering plates 7 and 8 are secured inside of the main fluid passage gap 10 between them. The metering plates 7 and 8 are secured in the nozzle 1 by press fit, adhesive, welding, threading, soldering, brazing, or threaded fastener. The metering plates 7 and 8 each have sealing gaskets or o-rings around the perimeter of the metering plates 7 or 8 to seal the intersection between the metering plates 7 and 8 and the inner wall of the main fluid passage 17 in the nozzle 1.

Referring to FIG. 6, in an embodiment, the first metering plate 7 has multiple round orifices 11 in multiple circular patterns. The orifices 11 are sized and positioned for efficient flow of fluid past the metering plate 7 and a predetermined pressure drop at LP and high flow while a minimal pressure drop at UHP and low flow. As stated above, the first metering plate 7 has a threaded hole 23 into which the stem 4 threads. The threads of the metering plate 7 can be made of or coated with a friction-reducing material such that the stem threads freely through the first metering plate 7.

Referring to FIG. 7, in an embodiment, the second metering plate 8 has multiple round orifices 11 in positions on the metering plate. The orifice 11 size, shape, and positions are specified such that there is a predetermined pressure drop across the second metering plate 8 at LP and high flow while there is minimal pressure drop across the second metering plate under UHP and low flow. Additionally, the first metering plate 7 and second metering plates 8 are positioned such that the orifices 11 are staggered and a jet produced by fluid passing through the second metering plate 8 is directed to a portion of the first metering plate 7 between or outside of an orifice 11 of the first metering plate 7. Further, the orifices 11 have been optimized to reduce cavitation of the flow after each of the metering plates 7 and 8. The minimization of cavitation of the fluid flow through the plates 7 and 8 minimizes erosion of the internal components and surfaces of the barrel portions 20 and 21 and allows the nozzle 1 to dispense more fluid more efficiently.

The metering plates 7 and 8 can be designed such that there is a pressure drop of 100 psi across the orifice 5 when operating in LP mode despite a higher fluid supply pressure at fitting 18. For example, if LP fluid is supplied at 650 psi and 100 gpm to fitting 18, the second metering plate 8 can be designed such that fluid passing through orifices 11 of metering plate 8 experiences a pressure drop of 350 psi. Subsequently, the first metering plate 7 can be designed such that fluid coming from the second metering plate 8 and passing through orifices 11 of the first metering plate 7 at 100 gpm will experience a 200 psi pressure drop. This two-stage pressure drop results in a fluid pressure of 100 psi at the entrance of the orifice 5. This two-step pressure drop before the orifice 5 helps to decrease cavitation of the fluid flow and create a more consistent and efficient fluid flow through the nozzle 1. Further it helps reduce cavitation of the fluid flow in the nozzle 1, reducing wear and tear on the internal components of the nozzle 1. By reducing the pressure to 100 psi upstream of the orifice 5, the droplets that are created in the LP spray are larger, and carry farther in windy conditions.

Referring again to FIG. 5, the front barrel portion 20 is secured to the barrel upstream tube 21 with a rear barrel portion 22. The rear barrel portion 22 is connected to the barrel upstream portion 21 with a threaded connection. The rear barrel portion 22 connects to the front barrel portion 20 with a cam mechanism 9, as shown in FIG. 12. A protrusion 29 on an inner circumferential surface of the front barrel portion 20 (FIG. 13) interlocks with a groove 28 in an outer circumferential surface on the rear barrel portion 22 (FIG. 14).

The front barrel portion 20 is surrounded with a shaper 16. The shaper 16 is used to convert the nozzle from a fog to a stream mode in LP mode only. This shaper 16 is connected to the front barrel portion 20 with a cam mechanism 9 about which the shaper 16 can rotate and move linearly along the longitudinal axis 24 of the nozzle 1 and the front barrel portion 20. The internal surface of the shaper 16 has a smooth surface. When the shaper 16 is rotated and moved distally along the front barrel portion 20, the smooth inner surface of the shaper 16 can intersect a fluid flow moving along the distal conical surface 6 of the front barrel portion 20. When in the distal position, the shaper 16 directs the fluid flow into a narrow stream moving approximately linearly away from the distal end of the front barrel portion 20. When the shaper 16 is rotated such that it is moved proximally along the front barrel portion 20, the inner surface of the shaper 16 does not intersect a fluid flow moving along the distal conical surface 6 of the front barrel section 20. This position of the shaper 16 allows for a wide or fog spray pattern of the dispensed fluid.

The barrel upstream tube 21, as shown in FIG. 5, has a fitting 18 at the proximal end. The fitting 18 is threaded into the barrel upstream tube 21 and provides a connection to a hose or pipe from which the nozzle 1 will receive fluid flow. The fitting 18 can have a pipe thread or any other fluid conduit fitting (e.g., bayonet, push-to-connect, v-band, gasket flange and bolts, etc.).

When operating in ultra-high pressure mode, the small gap 19 between the stem metering surface 15 and the orifice 5 can become plugged with debris, even with a wobble as described above. In some embodiments, the nozzle is designed to have a "flush" mode. This particular mode occurs naturally in the LP mode. The second metering plate 8 functions as a strainer for large debris, and the gap for LP mode is large enough to flush any debris that may make it through the strainer, so that the internals of the nozzle do not experience any plugging, or at least experience minimal plugging. For example, the orifices of the second metering plate 8 are designed to be smaller than any of the downstream features when the nozzle is in the LP mode. Accordingly, if the nozzle becomes plugged in UHP mode, a firefighter is able to continue delivering fire-extinguishing media at LP without concern of plugging, and while also clearing any fine debris accumulated during UHP mode. This is in contrast to known or existing UHP nozzles, which suffer from problems of plugging, and which cease to be effective nozzles while clearing debris from the nozzle.

What is claimed is:

1. A nozzle for dispensing a fluid comprising:

a barrel having:

a proximal end and a distal end;

a passage defined by a first internal surface extending between the distal end and the proximal end; and a barrel orifice defined by a second internal surface in an area adjacent to the distal end of the barrel;

a stem located at least partially in the passage of the barrel, wherein a distal portion of the stem includes a protrusion, such that a gap is defined between the second internal surface and the protrusion of the stem, wherein in the low pressure mode, the barrel is positioned such that the gap is wider than it is in the high pressure mode, and in the high pressure mode, the barrel is positioned such that the gap is narrower than it is in the low pressure mode;

the barrel being movable in relation to the stem to switch between a low pressure mode and a high pressure mode;

a metering plate fixed within the passage of the barrel, the metering plate having at least one metering plate orifice through which fluid passes, the stem being connected to the metering plate via a mechanical connection so that a distal portion of the stem is configured to wobble in response to fluid passing through the passage within the barrel orifice;

a shaper located around an outer surface of the distal end of the barrel, the shaper being movable in relation to the barrel to switch between a fog mode and a stream mode while in the low pressure mode.

2. The nozzle of claim 1, wherein the barrel is moved in a proximal direction to switch from the high pressure mode to the low pressure mode, and wherein the barrel is moved in a distal direction to switch from the low pressure mode to the high pressure mode.

3. The nozzle of claim 2, wherein the barrel is movable in relation to the stem by rotating a first portion of the barrel in relation to a second portion of the barrel.

4. The nozzle of claim 1, wherein the protrusion of the stem has a first cross section and a proximal end of the stem has a second cross section, wherein the first cross section is larger than the second cross section in a direction perpendicular to a longitudinal axis of the stem.

5. The nozzle of claim 1, wherein in the low pressure mode, the shaper is moved in a proximal direction to switch from the stream mode to the fog mode, and wherein the shaper is moved in a distal direction to switch from the fog mode to the stream mode.

6. The nozzle of claim 1, wherein the barrel has a front face with a concave conical surface that extends from the barrel orifice.

7. The nozzle of claim 6, wherein in the stream mode, a stream of fluid extending from the concave conical surface intersects with the shaper, and wherein in the fog mode, the stream of fluid extending from the concave conical surface does not intersect the shaper.

8. The nozzle of claim 1, wherein the shaper is connected to the barrel with a cam mechanism;

wherein the shaper is switched from the stream mode to the fog mode, and from the fog mode to the stream mode, by rotating the shaper in relation to the barrel and about the cam mechanism.

9. The nozzle of claim 1, wherein the barrel is movable in relation to the stem to switch between the low pressure mode, a high pressure stream mode, and a high pressure fog mode.

10. The nozzle of claim 1, wherein the metering plate is a first metering plate, and the barrel further comprises a second metering plate fixed in the passage upstream relative to the first metering plate, the second metering plate having at least one metering plate orifice, and wherein during the low pressure mode, each of the first metering plate and the second metering plate reduces a pressure of the fluid passing through the passage.

11. The nozzle of claim 1, wherein the barrel comprises at least a first barrel piece and a second barrel piece;

wherein the first barrel piece has the barrel orifice and contains the stem;

wherein the second barrel piece has the metering plate; and wherein the first barrel piece is moved in relation to the stem by rotating the first barrel piece in relation to the second barrel piece.

12. The nozzle of claim 11, wherein the first barrel piece moves proximally or distally in relation to the second barrel piece when the first barrel piece is rotated in relation to the second barrel piece.

13. The nozzle of claim 1, wherein the nozzle has a connector at a proximal end of the nozzle for connecting the nozzle to a fluid conduit;

wherein the fluid conduit is connected to a fluid reservoir;

wherein the nozzle receives fluid from the fluid reservoir via the fluid conduit.

14. The nozzle of claim 1, wherein an amplitude by which the distal portion of the stem wobbles is equal to or less than a distance of the gap between the protrusion and the second internal surface of the barrel orifice.

15. The nozzle of claim 1, wherein the protrusion is configured to fit within the passage at the barrel orifice.

16. A nozzle for dispensing a fluid comprising:

a barrel having a proximal end and a distal end, the barrel having a first barrel piece at the distal end of the barrel and a second barrel piece at the proximal end of the barrel, the first barrel piece rotatable in relation to the second barrel piece;

the barrel having a passage defined by a first internal surface extending between the distal end and the proximal end of the barrel, and a barrel orifice defined by a second internal surface in an area adjacent to the distal end of the barrel, the barrel being configured to transmit the fluid from the proximal end to the distal end;

a stem located at least partially in the passage, the stem having a proximal end with a first cross section;

the stem having a distal portion with a metering surface, the distal portion having a second cross section which is larger than the first cross section in a direction perpendicular to a longitudinal axis of the stem;

a gap defined between the second internal surface of the barrel and the metering surface of the stem;

the barrel having a first metering plate located upstream relative to the barrel orifice, the first metering plate having at least one first metering orifice;

wherein the stem is connected to the first metering plate via a mechanical connection so that the distal portion of the stem is configured to wobble in response to fluid passing though the passage within the barrel orifice;

the barrel having a second metering plate located upstream relative to the first metering plate, the second metering plate having at least one second metering orifice;

wherein the first barrel piece is movable proximally and distally along the stem by rotating the first barrel piece in relation to the second barrel piece whereby the gap is wider in a low pressure mode and narrower in a high pressure mode, wherein the metering surface remains positioned within the barrel when the first barrel piece is moved proximally and when the first barrel piece is moved distally;

a shaper surrounding the distal end of the barrel and connected to the first barrel piece with a cam track, the shaper having a front surface facing in a distal direction of the barrel, the shaper being movable along the barrel between a low pressure stream position and a low pressure fog position;

the barrel having a concave conical surface in a distal end surface of the first barrel piece;

wherein in the low pressure stream position, the shaper is rotated about the barrel to an extended distal position that intersects a stream of fluid extending from the conical surface, and in the low pressure fog position, the shaper is rotated about the barrel to a proximal position and a stream of fluid extending from the conical surface passes by the shaper in the distal direction of the barrel;

wherein in the low pressure mode, the at least one first metering orifice of the first metering plate and the at least one second metering orifice of the second metering plate are each designed to cause a pressure drop in the fluid and reduce cavitation within the passage.

17. The nozzle of claim 16, wherein the nozzle has a connector at a proximal end of the nozzle for connecting the nozzle to a fluid conduit;

wherein the fluid conduit is connected to a fluid reservoir;

wherein the nozzle receives fluid from the fluid reservoir via the fluid conduit.

18. The nozzle of claim 16, wherein the low pressure mode flushes said fluid through said barrel to relieve plugging that may occur during operation in the ultra-high pressure mode.

19. A nozzle for dispensing a fluid comprising:

a barrel having:

a proximal end and a distal end;

a passage defined by a first internal surface extending between the distal end and the proximal end; and a barrel orifice defined by a second internal surface in an area adjacent to the distal end of the barrel;

a stem located at least partially in the passage of the barrel, wherein a distal portion of the stem includes a protrusion, such that a gap is defined between the second internal surface and the protrusion of the stem, wherein in the low pressure mode, the barrel is positioned such that the gap is wider than it is in the high pressure mode, and in the high pressure mode, the barrel is positioned such that the gap is narrower than it is in the low pressure mode;

the barrel being movable in relation to the stem to switch between a low pressure mode and a high pressure mode;

a first metering plate and a second metering plate fixed within the passage of the barrel, the first metering plate and the second metering plate each having at least one metering plate orifice through which fluid passes, the stem being connected to the first metering plate, the second metering plate being located upstream relative to the first metering plate;

a shaper located around an outer surface of the distal end of the barrel, the shaper being movable in relation to the barrel to switch between a fog mode and a stream mode while in the low pressure mode;

wherein the at least one metering plate orifice of the first metering plate and the at least one metering plate orifice of the second metering plate are staggered relative to each other;

wherein in the low pressure mode, the at least one metering plate orifice of the first metering plate and the at least one metering plate orifice of the second metering plate are each designed to cause a pressure drop in the fluid and reduce cavitation within the passage.

* * * * *